United States Patent
Ide et al.

(10) Patent No.: US 9,285,235 B2
(45) Date of Patent: Mar. 15, 2016

(54) INFORMATION PROCESSING DEVICE, INFORMATION PROCESSING METHOD, AND PROGRAM

(75) Inventors: Naoki Ide, Tokyo (JP); Yoshiyuki Kobayashi, Tokyo (JP); Masato Ito, Tokyo (JP); Kohtaro Sabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/005,648

(22) PCT Filed: Mar. 16, 2012

(86) PCT No.: PCT/JP2012/056811
§ 371 (c)(1),
(2), (4) Date: Sep. 17, 2013

(87) PCT Pub. No.: WO2012/132950
PCT Pub. Date: Oct. 4, 2012

(65) Prior Publication Data
US 2014/0012495 A1    Jan. 9, 2014

(30) Foreign Application Priority Data
Mar. 25, 2011  (JP) ................................. 2011-067136
Mar. 25, 2011  (JP) ................................. 2011-067137

(51) Int. Cl.
*G01C 21/00*    (2006.01)
*G01C 21/36*    (2006.01)
(Continued)

(52) U.S. Cl.
CPC ........ *G01C 21/3617* (2013.01); *G01C 21/3484* (2013.01)

(58) Field of Classification Search
None
See application file for complete search history.

(56) References Cited

U.S. PATENT DOCUMENTS 6,263,276 B1 * 7/2001 Yokoyama et al. ........... 701/420
7,379,812 B2 * 5/2008 Yoshioka et al. ............. 701/426
(Continued)

FOREIGN PATENT DOCUMENTS

JP    2000-155167 A    6/2000
JP    2005-128808 A    5/2005
(Continued)

OTHER PUBLICATIONS

Machine translation of full documet JP 2006-166421 submitted in the IDS filed Sep. 17, 2013.*

(Continued)

*Primary Examiner* — Rami Khatib
*Assistant Examiner* — Navid Ziaeianmehdizadeh
(74) *Attorney, Agent, or Firm* — Hazuki International, LLC

(57) ABSTRACT

The present technique relates to an information processing device, an information processing method and a program which can accumulate sufficient movement history data with a little power consumption. A similarity search unit searches for a past route similar to the immediate movement history which is acquired by a position sensor unit and which has time series position data, from the search data stored in a past history DB. A fitness determination unit determines whether or not goodness of fit of the past route searched by the similarity search unit and the immediate movement history is a predetermined threshold or more. A sensor control unit controls an acquisition interval of the position data of the position sensor unit according to a determination result of the fitness determination unit. The technique of this disclosure is applicable to a prediction device which, for example, acquires position data and predicts a predicted route.

17 Claims, 36 Drawing Sheets

(51) Int. Cl.
*G01C 21/34* (2006.01)
*G06N 5/00* (2006.01)

(56) References Cited

U.S. PATENT DOCUMENTS

| | | | |
|---|---|---|---|
| 7,419,095 B2* | 9/2008 | Yoshioka et al. | 235/384 |
| 7,472,099 B2 | 12/2008 | Nishiuma et al. | |
| 7,809,502 B2* | 10/2010 | Iizuka et al. | 701/420 |
| 8,781,716 B1* | 7/2014 | Wenneman et al. | 701/118 |
| 2003/0093217 A1* | 5/2003 | Petzold et al. | 701/201 |
| 2004/0093392 A1* | 5/2004 | Nagamatsu et al. | 709/218 |
| 2007/0294030 A1 | 12/2007 | Jones | |
| 2010/0010733 A1* | 1/2010 | Krumm | 701/201 |
| 2010/0191462 A1* | 7/2010 | Kobuya et al. | 701/208 |
| 2010/0332130 A1* | 12/2010 | Shimizu et al. | 701/209 |
| 2011/0028164 A1* | 2/2011 | Kato | 455/456.1 |
| 2011/0137835 A1* | 6/2011 | Ito et al. | 706/12 |
| 2011/0137907 A1* | 6/2011 | Ikenoue | 707/740 |
| 2011/0238289 A1* | 9/2011 | Lehmann et al. | 701/201 |
| 2011/0244859 A1* | 10/2011 | Tsuda | 455/436 |
| 2011/0313957 A1* | 12/2011 | Ide et al. | 706/12 |
| 2012/0265433 A1* | 10/2012 | Viola et al. | 701/410 |
| 2013/0238241 A1* | 9/2013 | Chelotti et al. | 701/533 |

FOREIGN PATENT DOCUMENTS

| | | |
|---|---|---|
| JP | 2006-166421 A | 6/2006 |
| JP | 2009-085798 A | 4/2009 |
| JP | 2010-145115 A | 7/2010 |

OTHER PUBLICATIONS

Supplementary European Search Report from EP Application No. 12764157, dated Aug. 19, 2014.

* cited by examiner

FIG. 7

| TIME | LONGITUDE | LATITUDE |
|---|---|---|
| 9.00000 | 139.681436 | 35.58789 |
| 9.01667 | 139.681354 | 35.591633 |
| 9.03333 | 139.682945 | 35.59443 |
| 9.05000 | 139.687815 | 35.597961 |
| 9.06667 | 139.687815 | 35.597961 |
| 9.08333 | 139.697439 | 35.601937 |
| 9.10000 | 139.701271 | 35.60403 |
| 9.11667 | 139.704385 | 35.605843 |
| 9.13333 | 139.706996 | 35.607532 |
| 9.15000 | 139.709166 | 35.61013 |
| 9.16667 | 139.712419 | 35.613986 |
| 9.18333 | 139.716662 | 35.61775 |
| 9.20000 | 139.716662 | 35.61775 |
| 9.21667 | 139.720327 | 35.620449 |
| 9.23333 | 139.722942 | 35.622529 |
| 9.25000 | 139.722942 | 35.622529 |
| 9.26667 | 139.722942 | 35.622529 |
| 9.28333 | 139.722942 | 35.622529 |
| 9.30000 | 139.722942 | 35.622529 |
| 9.31667 | 139.723938 | 35.623615 |
| 9.33333 | 139.723938 | 35.623615 |
| 9.35000 | 139.725284 | 35.624404 |
| 9.36667 | 139.726604 | 35.623746 |
| 9.38333 | 139.72799 | 35.623709 |
| 9.40000 | 139.729638 | 35.623657 |
| 9.41667 | 139.730842 | 35.623638 |
| 9.43333 | 139.730842 | 35.623638 |
| 9.45000 | 139.732807 | 35.623528 |
| 9.46667 | 139.732807 | 35.623528 |
| 9.48333 | 139.732807 | 35.623528 |
| 9.50000 | 139.732807 | 35.623528 |
| 9.51667 | 139.733331 | 35.623707 |
| 9.53333 | 139.733331 | 35.623707 |
| 9.55000 | 139.733331 | 35.623707 |
| 9.56667 | 139.733331 | 35.623707 |
| 9.58333 | 139.733331 | 35.623707 |
| 9.60000 | 139.733331 | 35.623707 |

| DESTINATION | LONGITUDE | LATITUDE |
|---|---|---|
| 1 | 139.733184 | 35.624126 |
| 2 | 139.733184 | 35.624126 |
| 3 | 139.733184 | 35.624126 |
| 4 | 139.733184 | 35.624126 |
| 5 | 139.733184 | 35.624126 |
| 6 | 139.733184 | 35.624126 |

FIG. 18

| INTERNAL MODEL | | | OBSERVATION MODEL | | | | | | |
|---|---|---|---|---|---|---|---|---|---|
| CURRENT NODE $S_i$ | TRANSITION DESTINATION NODE $S_j$ | TRANSITION PROBABILITY $a_{ij}$ | CENTER VALUE $\mu_i$ | | | VARIANCE $\sigma_i$ | | | |
| | | | TIME | LONGITUDE | LATITUDE | TIME | LONGITUDE | | LATITUDE |
| 1 | 1 | 0.50000 | 9.18333 | 139.716662 | 35.61775 | 4.0000 | 0.0000001 | | 0.0000001 |
| 1 | 2 | 0.50000 | – | – | – | – | – | | – |
| 2 | 3 | 1.00000 | 9.21667 | 139.720327 | 35.620449 | 4.0000 | 0.0000001 | | 0.0000001 |
| 3 | 4 | 1.00000 | 9.23333 | 139.722942 | 35.622529 | 4.0000 | 0.0000001 | | 0.0000001 |
| 4 | 5 | 1.00000 | 9.25000 | 139.722942 | 35.622529 | 4.0000 | 0.0000001 | | 0.0000001 |
| 5 | 5 | 0.80000 | 9.26667 | 139.722942 | 35.622529 | 4.0000 | 0.0000001 | | 0.0000001 |
| 5 | 6 | 0.20000 | – | – | – | – | – | | – |
| 6 | 7 | 1.00000 | 9.30000 | 139.722942 | 35.622529 | 4.0000 | 0.0000001 | | 0.0000001 |
| 7 | 8 | 1.00000 | 9.31667 | 139.723938 | 35.623615 | 4.0000 | 0.0000001 | | 0.0000001 |
| 8 | 8 | 1.00000 | 9.33333 | 139.723938 | 35.623615 | 4.0000 | 0.0000001 | | 0.0000001 |
| 8 | 10 | 1.00000 | 9.35000 | 139.725284 | 35.624404 | 4.0000 | 0.0000001 | | 0.0000001 |
| 9 | 11 | 1.00000 | 9.36667 | 139.726604 | 35.623746 | 4.0000 | 0.0000001 | | 0.0000001 |
| 10 | 11 | 1.00000 | 9.38333 | 139.72799 | 35.623709 | 4.0000 | 0.0000001 | | 0.0000001 |
| 11 | | 1.00000 | | | | | | | |

FIG. 29

| INTERNAL MODEL | | | OBSERVATION MODEL | | | | | |
|---|---|---|---|---|---|---|---|---|
| CURRENT NODE $S_i$ | TRANSITION DESTINATION NODE $S_j$ | TRANSITION FREQUENCY | CENTER VALUE $\mu_i$ | | | VARIANCE $\sigma_i$ | | |
| | | | TIME | LONGITUDE | LATITUDE | TIME | LONGITUDE | LATITUDE |
| 1 | 1 | 1 | 9.18333 | 139.716662 | 35.61775 | 4.0000 | 0.0000001 | 0.0000001 |
| ⋮ | 2 | 1 | ⋮ | ⋮ | ⋮ | ⋮ | ⋮ | ⋮ |
| 2 | 3 | 1 | 9.21667 | 139.720327 | 35.620449 | 4.0000 | 0.0000001 | 0.0000001 |
| 3 | 4 | 1 | 9.23333 | 139.722942 | 35.622529 | 4.0000 | 0.0000001 | 0.0000001 |
| 4 | 5 | 1 | 9.25000 | 139.722942 | 35.622529 | 4.0000 | 0.0000001 | 0.0000001 |
| 5 | 5 | 4 | 9.26667 | 139.722942 | 35.622529 | 4.0000 | 0.0000001 | 0.0000001 |
| ⋮ | 6 | 1 | ⋮ | ⋮ | ⋮ | ⋮ | ⋮ | ⋮ |
| 6 | 7 | 1 | 9.30000 | 139.722942 | 35.622529 | 4.0000 | 0.0000001 | 0.0000001 |
| 7 | 8 | 1 | 9.31667 | 139.723938 | 35.623615 | 4.0000 | 0.0000001 | 0.0000001 |
| 8 | 8 | 11 | 9.33333 | 139.723938 | 35.623615 | 4.0000 | 0.0000001 | 0.0000001 |
| 9 | 10 | 1 | 9.35000 | 139.725284 | 35.624404 | 4.0000 | 0.0000001 | 0.0000001 |
| 10 | 11 | 1 | 9.36667 | 139.726604 | 35.623746 | 4.0000 | 0.0000001 | 0.0000001 |
| 11 | 11 | 14 | 9.38333 | 139.72799 | 35.623709 | 4.0000 | 0.0000001 | 0.0000001 |

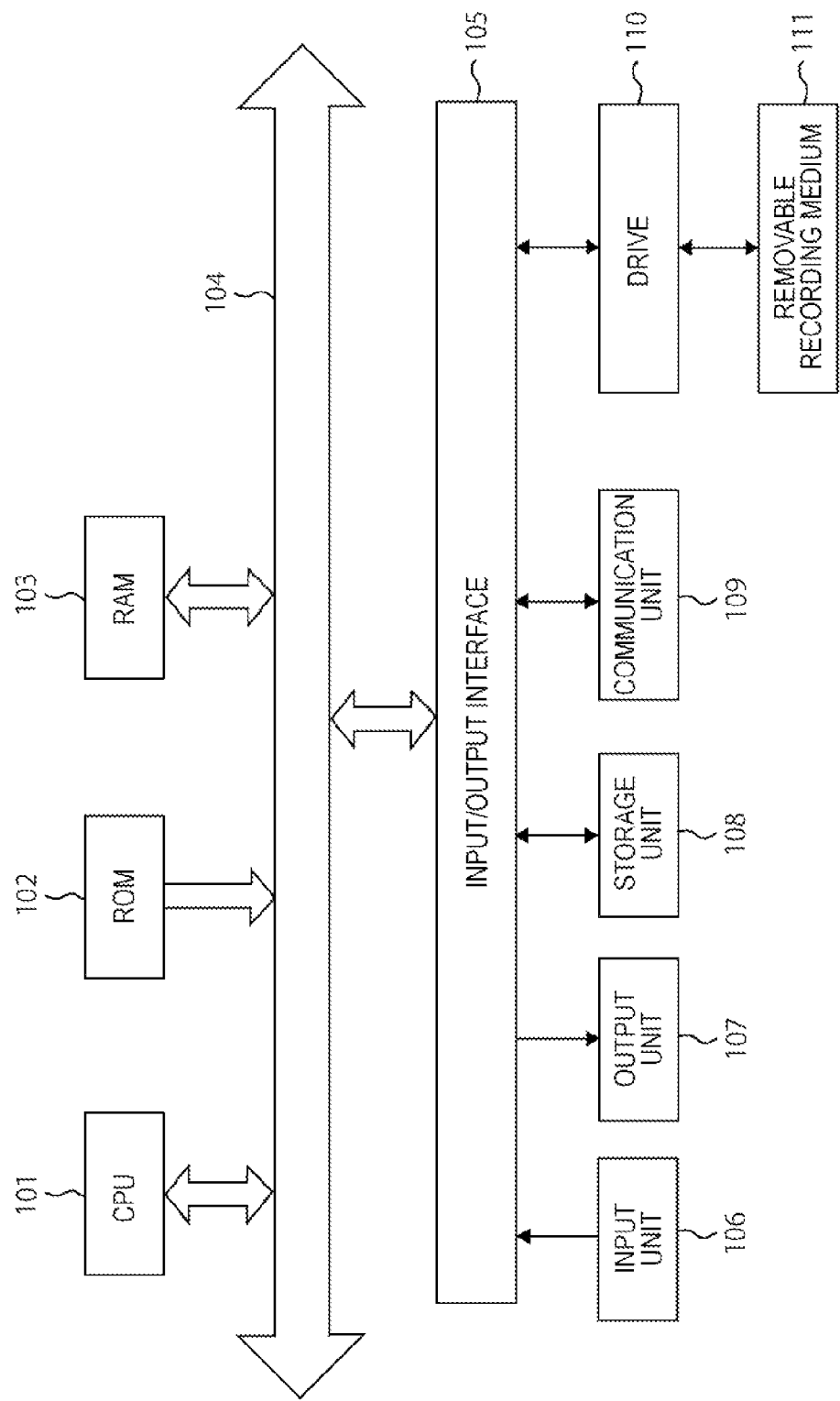

INFORMATION PROCESSING DEVICE, INFORMATION PROCESSING METHOD, AND PROGRAM

CROSS-REFERENCE TO RELATED APPLICATIONS

The present application is a national phase entry under 35 U.S.C. §371 of International Application No. PCT/JP2012/056811 filed Mar. 16, 2012, published on Oct. 4, 2012 as WO 2012/132950 A1, which claims priority from Japanese Patent Application Nos. JP 2011-067137 filed in the Japanese Patent Office on Mar. 25, 2011 and JP 2011-067136 filed in the Japanese Patent Office on Mar. 25, 2011.

TECHNICAL FIELD

The present technique relates to an information processing device, an information processing method and a program, and, more particularly, relates to an information processing device, an information processing method and a program which can accumulate sufficient movement history data with a little power consumption.

BACKGROUND ART

A method of predicting a movement route from a current point as a starting point includes searching for a route similar to a current movement history from a database of past movement histories, and outputting a resulting route as a predicted route (see, for example, Patent Document 1).

Such a prediction method needs to sufficiently accumulate past movement histories which are a database. Further, that accumulated past movement history data is precise is also important.

CITATION LIST

Patent Document

Patent Document 1: Japanese Patent Application Laid-Open No. 2000-155167

SUMMARY OF THE INVENTION

Problems to be Solved by the Invention

One method of accumulating a precise movement history includes setting a short acquisition interval of a position sensor which acquires a current place.

However, for example, a mobile terminal on which a position sensor is mounted consumes significant power when an acquisition interval is simply set short, and therefore a battery life becomes short.

In light of this situation, the present technique can store sufficient movement history data with a little power consumption.

Solutions to Problems

An information processing device according to one aspect of the present technique has: a position sensor unit which acquires an immediate movement history which includes time series position data; a past history DB which stores search data; a similarity search unit which searches for a past route similar to the immediate movement history from the search data; a fitness determination unit which determines whether or not goodness of fit of the past route searched by the similarity search unit and the immediate movement history is a predetermined threshold or more; and a sensor control unit which controls an acquisition interval of the position data of the position sensor unit according to a determination result of the fitness determination unit.

An information processing method according to one aspect of the present technique includes the steps of, at an information processing device which has a past history DB which stores search data: acquiring an immediate movement history which includes time series position data; searching for a past route similar to the immediate movement history from the search data; determining whether or not goodness of fit of the searched past route and the immediate movement history is a predetermined threshold or more; and controlling an acquisition interval of the position data of the position sensor unit according to a determination result.

A program according to one aspect of the present technique causes a computer to function as: a similarity search unit which searches for a past route similar to the immediate movement history which is acquired by a position sensor unit and which includes time series position data, from the search data stored in a past history DB; a fitness determination unit which determines whether or not goodness of fit of the past route searched by the similarity search unit and the immediate movement history is a predetermined threshold or more; and a sensor control unit which controls an acquisition interval of the position data of the position sensor unit according to a determination result of the fitness determination unit.

According to one aspect of the present technique, a past route similar to the immediate movement history which is acquired by a position sensor unit and which includes time series position data, is searched from the search data stored in a past history DB, whether or not goodness of fit of the searched past route and the immediate movement history is a predetermined threshold or more, and an acquisition interval of the position data of the position sensor unit is controlled according to a determination result.

A program can be provided by being transmitted through a transmission medium or being recorded in a recording medium.

An information processing device may be an independent device or an internal block which forms one device.

Effects of the Invention

According to one aspect of the present technique, it is possible to accumulate sufficient movement history data with a little power consumption.

BRIEF DESCRIPTION OF DRAWINGS

FIG. 7 is a view illustrating a data example of a past movement history stored in a route log DB.

FIG. 18 is a view illustrating an example of an observation model and an internal model of each status node of an HMM.

FIG. 29 is a view illustrating an example of a transition frequency table.

FIG. 37 is a block diagram illustrating an example structure of an embodiment of a computer to which the present technique is applied.

MODE FOR CARRYING OUT THE INVENTION

The following is a description of modes (hereinafter referred to as embodiments) for carrying out the present technique. Explanation will be made in the following order.

1. Outline of Operation of Prediction Device
2. First Embodiment (Example Structure of Performing Control based on Database of Route Logs)
3. Second Embodiment (Example Structure of Performing Control based on Database Stochastic Transition Model)
4. Third Embodiment (Example Structure which can selectively execute First Embodiment and Second Embodiment)
5. Fourth Embodiment (Example Structure which has one of Sensor Control Function and Data Correction Function)

1. Outline of Operation of Prediction Device

Example Structure of Prediction Device

Figure 1:
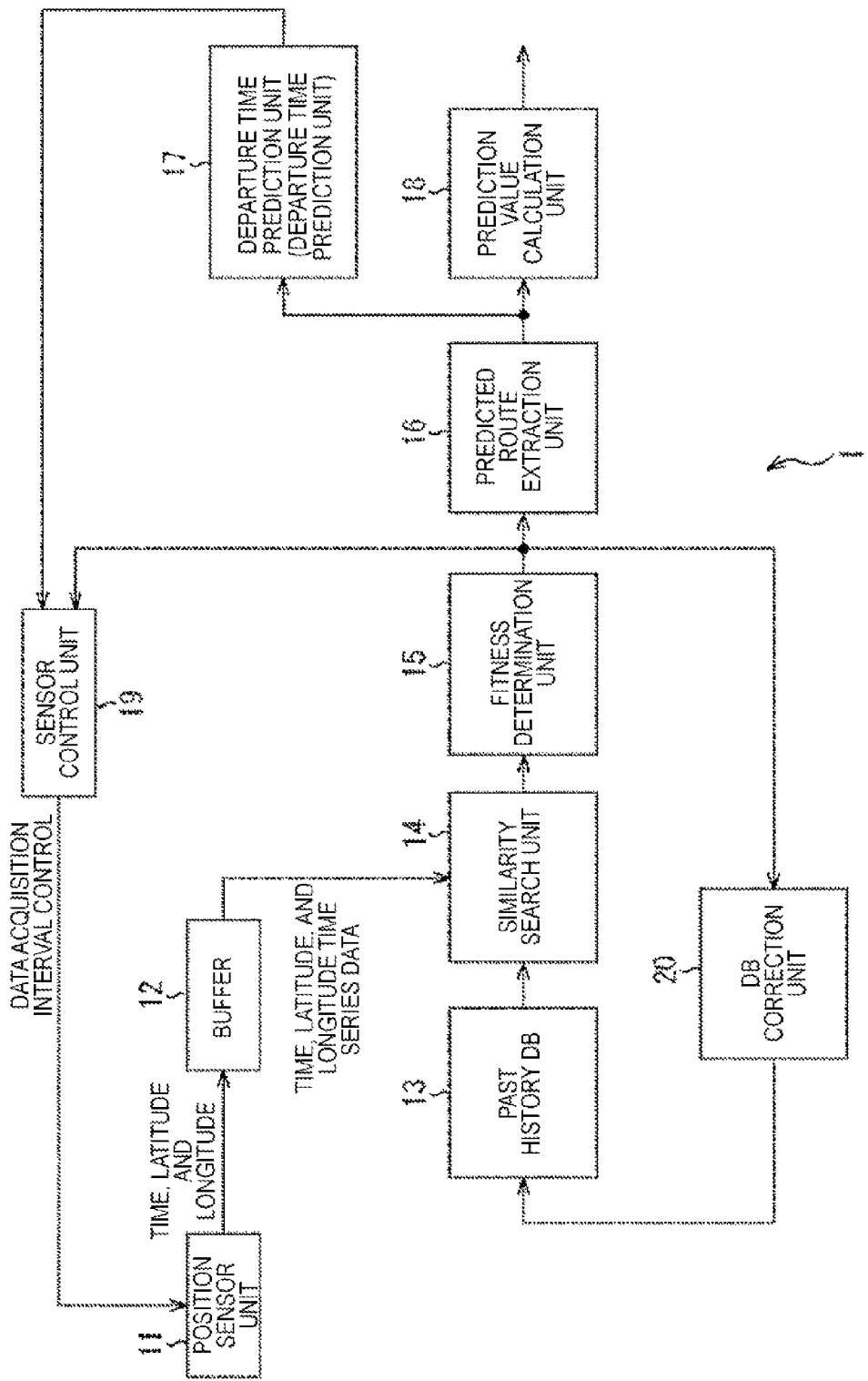
FIG. 1 is a block diagram illustrating an example structure of a prediction device to which the present technique is applied.

FIG. 1 is a block diagram illustrating an example structure of a prediction device to which the present technique is applied.

A prediction device 1 in FIG. 1 is a device which predicts a user movement route based on position information acquired from a position sensor such as a GPS (Global Positioning System) sensor and predicts a destination and a route or a predicted time to reach this destination. This prediction device 1 is formed as a single mobile device or a device which is part of a mobile terminal such as a mobile telephone or a table terminal.

The prediction device 1 is formed with a position sensor unit 11, a buffer 12, a past history DB 13, a similarity search unit 14, a fitness determination unit 15, a predicted route extraction unit 16, a departure time prediction unit 17, a prediction value calculation unit 18, a sensor control unit 19 and a DB correction unit 20.

The position sensor unit 11 sequentially acquires latitude/longitude data which indicates a current place of the position sensor unit, at a fixed time interval determined under control of the sensor control unit 19. The position sensor unit 11 supplies an acquisition time (current time), and (data of) the latitude and the longitude at this time, to the buffer 12.

The buffer 12 temporarily holds time, latitude and longitude data of a predetermined time supplied from the position sensor unit 11. Further, when one operation of the position sensor unit 11 of acquiring time, latitude and longitude data is referred to as "one step", the buffer 12 supplies time, latitude and longitude time series data (hereinafter, referred to as an "immediate movement history") which are a predetermined number of steps before from the current time, to the similarity search unit 14.

The past history DB 13 stores search data which the prediction device 1 needs to predict a movement route and a destination. Search data is a past movement history itself, the past movement history corrected where necessary or a learning model corresponding to a past movement history. In addition, although search data to be stored in the past history DB 13 is desirably generated by a user who uses a prediction result, the search data may be generated by other users.

Further, the past history DB 13 also stores a destination list which is a list of destinations in the past movement history. The destination list is created by, for example, being inputted in advance by a user or detecting a sojourn place within a predetermined range (100 m) for a predetermined time (for example, one hour) or more.

The similarity search unit 14 searches for a past route similar to the immediate movement history supplied from the buffer 12 from the search data stored in the past history DB 13, and supplies a search result to the fitness determination unit 15.

The fitness determination unit 15 determines whether or not a similar route of the search data searched by the similarity search unit 14 fits to the acquired immediate movement history. In other words, the fitness determination unit 15 determines whether or not the acquired immediate movement history is a known route acquired as search data, based on whether or not goodness of fit of the similar route of the search data obtained by search and the immediate movement history is a predetermined threshold or more. When the goodness of fit of the similar route of the search data obtained by search and the immediate movement history is a predetermined threshold or more, the fitness determination unit 15 determines the immediate movement route as a known route. Meanwhile, when the goodness of fit of the similar route of the searched search data and the immediate movement history is less than a predetermined threshold, the fitness determination unit 15 determines the immediate movement route as an unknown route.

The fitness determination unit 15 supplies a known or unknown determination result to the sensor control unit 19. Further, when determining the known route, the fitness determination unit 15 supplies the immediate movement route to the predicted route extraction unit 16 and the DB correction unit 20.

The predicted route extraction unit 16 extracts a predicted route from the search data of the past history DB 13 (predicts a movement route of a user) based on the known immediate movement history supplied from the fitness determination unit 15.

Further, the predicted route extraction unit 16 lists up reachable destinations from the extracted predicted route, based on the destination list. Furthermore, the predicted route extraction unit 16 supplies the extracted destination and the predicted route for reaching the destination, to the prediction value calculation unit 18, and supplies the predicted route to the departure time prediction unit 17.

Irrespectively of whether the user is currently moving or stops, the departure time prediction unit 17 predicts the departure time which is a time to depart from the current place as an absolute value or a relative value. That is, the departure time prediction unit 17 predicts the departure time to depart from the current place as the absolute time. Alternatively, the departure time prediction unit 17 predicts the time (departure time) to depart from the current place as the relative time. Which one of the absolute time and the relative time is used may be determined in response to user's selection. The departure time prediction unit 17 supplies a predicted departure time which is a prediction result to the sensor control unit 19.

The prediction value calculation unit 18 calculates and outputs a reach time, a route and a reach probability to a destination as prediction values based on the destination and the predicted route obtained based on the known immediate movement history supplied from the predicted route extraction unit 16. The prediction result outputted from the prediction value calculation unit 18 is displayed on, for example, a display which is not illustrated. Further, at a stage subsequent to the prediction value calculation unit 18, a mobile terminal is controlled using the prediction result.

The sensor control unit 19 receives a supply of a known or unknown determination result from the fitness determination unit 15. Further, the sensor control unit 19 receives a supply of the predicted departure time represented as one of the absolute time and the relative time from the departure time prediction unit 17.

The sensor control unit 19 controls a data acquisition interval at which the position sensor unit 11 acquires position data, according to the known or unknown determination result. More specifically, the sensor control unit 19 performs control such that the data acquisition interval becomes short when the known determination result is supplied, and performs control such that the data acquisition interval becomes long when the unknown determination result is supplied.

Further, the sensor control unit 19 can control the data acquisition interval of the position sensor unit 11 according to the predicted departure time supplied from the departure time prediction unit 17. More specifically, the sensor control unit 19 performs control such that the data acquisition interval becomes short when there is an extra time until the departure time, and performs control such that the data acquisition interval becomes long when the departure time comes soon. When the departure time comes soon, this also means that the user is moving.

The DB correction unit 20 receives a supply of the known immediate movement history from the fitness determination unit 15. The DB correction unit 20 corrects the known immediate movement history supplied from the fitness determination unit 15, based the search data stored in the past history DB 13, and supplies the immediate movement history to the past history DB 13.

Hence, although not illustrated in FIG. 1, the predicted route extraction unit 16, the prediction value calculation unit 18 and the DB correction unit 20 acquire the search data of the past history DB 13 where necessary and perform an operation.

The prediction device 1 formed as described above performs a prediction operation of predicting a movement route from a current location, a destination and a time required to go to the destination, based on the immediate known movement history acquired by the position sensor unit 11.

Further, the prediction device 1 performs a sensor control operation of controlling (changing) the data acquisition interval of the position sensor unit 11 based on whether or not the immediate movement history acquired by the position sensor unit 11 is known or unknown.

Furthermore, the prediction device 1 performs a data correction operation of correcting (data of) of the immediate movement history based on the known immediate movement history acquired by the position sensor unit 11.

Hereinafter, the prediction operation, the sensor control operation and the data correction operation will be described with reference to the flowcharts in FIGS. 2 to 5.

Flowchart of Prediction Operation

Figure 2:
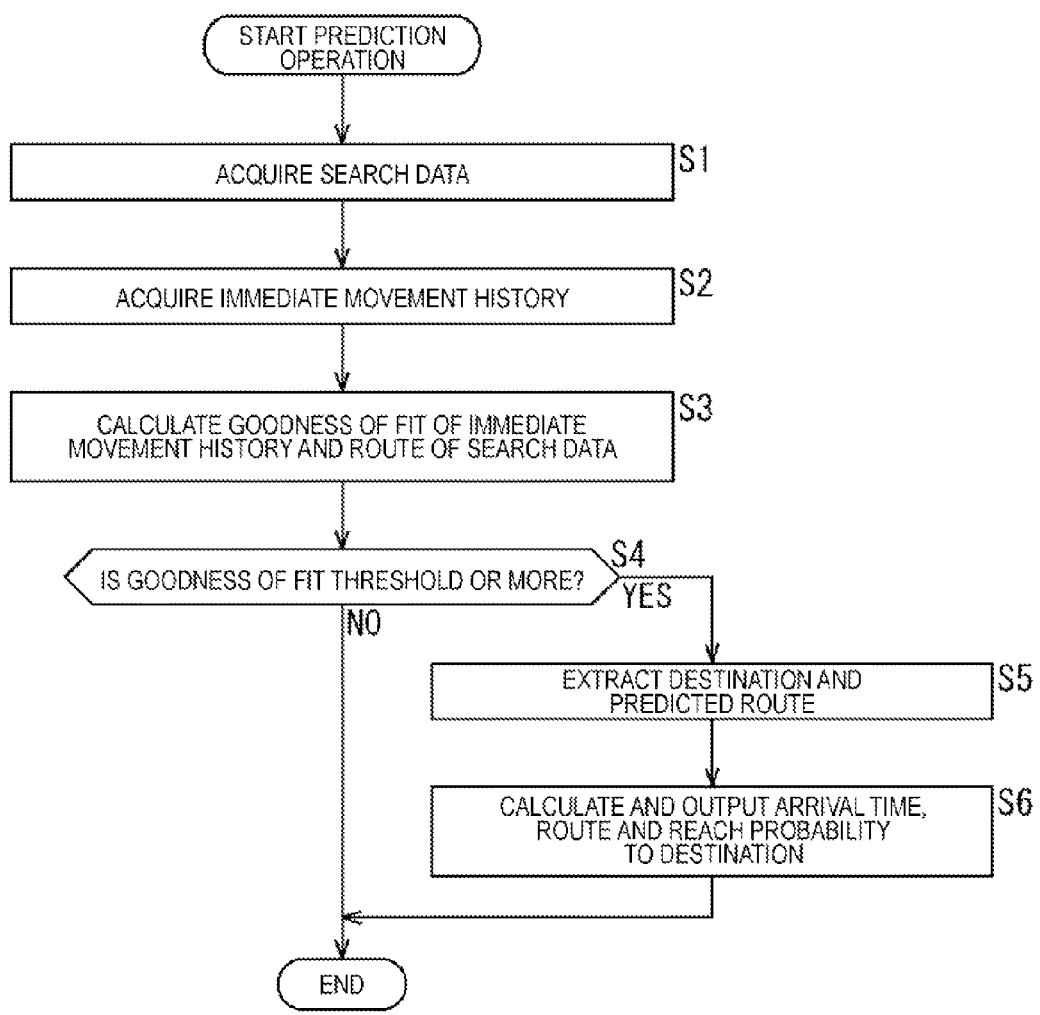
FIG. 2 is a flowchart for explaining a prediction operation.

FIG. 2 is a flowchart of the prediction operation performed by the prediction device 1 in FIG. 1. In addition, in FIGS. 2 to 5, data acquisition of the position sensor unit 11 and buffering of the buffer 12 are performed at all times.

First, in step S1, the similarity search unit 14 acquires search data from the past history DB 13.

In step S2, the similarity search unit 14 acquires the immediate movement history from the buffer 12.

In step S3, the similarity search unit 14 searches for a route similar to the immediate movement history from the acquired search data, and supplies the search result to the fitness determination unit 15. To which route of search data the immediate movement history is similar is searched by calculating for all items of search data the goodness of fit (similarity) of the immediate movement history and the route of search data.

In step S4, the fitness determination unit 15 determines whether goodness of fit of the immediate movement history and the route of search data is a predetermined threshold or more.

When it is determined in step S4 that goodness of fit of the immediate movement history and the route of search data is less than a predetermined threshold, the prediction operation is finished. That is, when the immediate movement history is an unknown route, prediction cannot be performed and therefore the operation is finished.

Meanwhile, when it is determined in step S4 that goodness of fit of the immediate movement history and the route of search data is a predetermined threshold or more, the operation moves to step S5, and the predicted route extraction unit 16 extracts a destination and a predicted route from search data of the past history DB 13.

Further, in step S6, the prediction value calculation unit 18 calculates and outputs a reach time, a route and a reach probability to the destination based on the extracted predicted route, and finishes the operation.

Flowchart of First Sensor Control Operation

Figure 3:
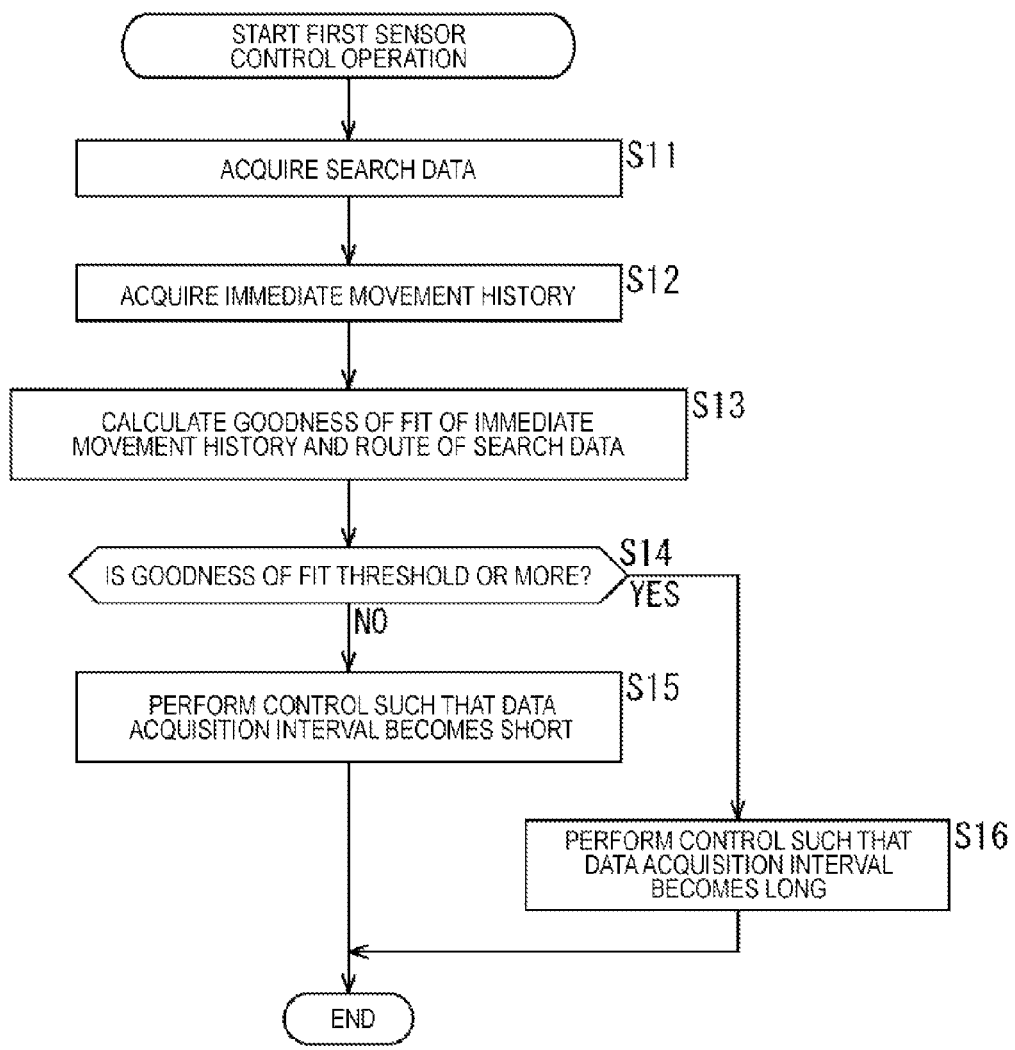
FIG. 3 is a flowchart for explaining a first sensor control operation.

FIG. 3 is a flowchart of the first sensor control operation of controlling the data acquisition interval of the position sensor unit 11 based only on a known or unknown determination result from the fitness determination unit 15.

First, in step S11, the similarity search unit 14 acquires search data from the past history DB 13.

In step S12, the similarity search unit 14 acquires the immediate movement history from the buffer 12.

In step S13, the similarity search unit 14 searches for a route similar to the immediate movement history from acquired search data, and supplies the search result to the fitness determination unit 15. To which route of search data the immediate movement history is similar is searched by calculating for all items of search data the goodness of fit (similarity) of the immediate movement history and the route of search data.

In step S14, the fitness determination unit 15 determines whether goodness of fit of the immediate movement history and the route of search data is a predetermined threshold or more.

The above operations in steps S11 to S14 are the same as the operations in steps S1 to S4 in FIG. 1, and one operation is commonly used between the prediction operation and the sensor control operation.

When it is determined in step S14 that goodness of fit of the immediate movement history and the route of search data is less than a predetermined threshold, that is, when the immediate movement history is an unknown route, the operation moves to step S15, and the sensor control unit 19 performs control such that the data acquisition interval becomes short and finishes the operation.

Meanwhile, when it is determined in step S14 that the goodness of fit of the immediate movement history and the route of search data is a predetermined threshold or more, that is, when the immediate movement history is a known route, the operation moves to step S16, and the sensor control unit 19 performs control such that the data acquisition interval becomes long and finishes the operation.

The operation in FIG. 3 is repeatedly executed.

As described above, in the first sensor control operation, when the immediate movement history is known, the route has already been learned, and therefore the data acquisition interval is set long. Meanwhile, when the immediate movement history is unknown, search data needs to be accumulated, and therefore the data acquisition interval is set short to acquire precise data. By this means, it is possible to make the data acquisition interval long when search data is unnecessary and, consequently, accumulate sufficient movement history data with a little power consumption.

Flowchart of Second Sensor Control Operation

Figure 4:
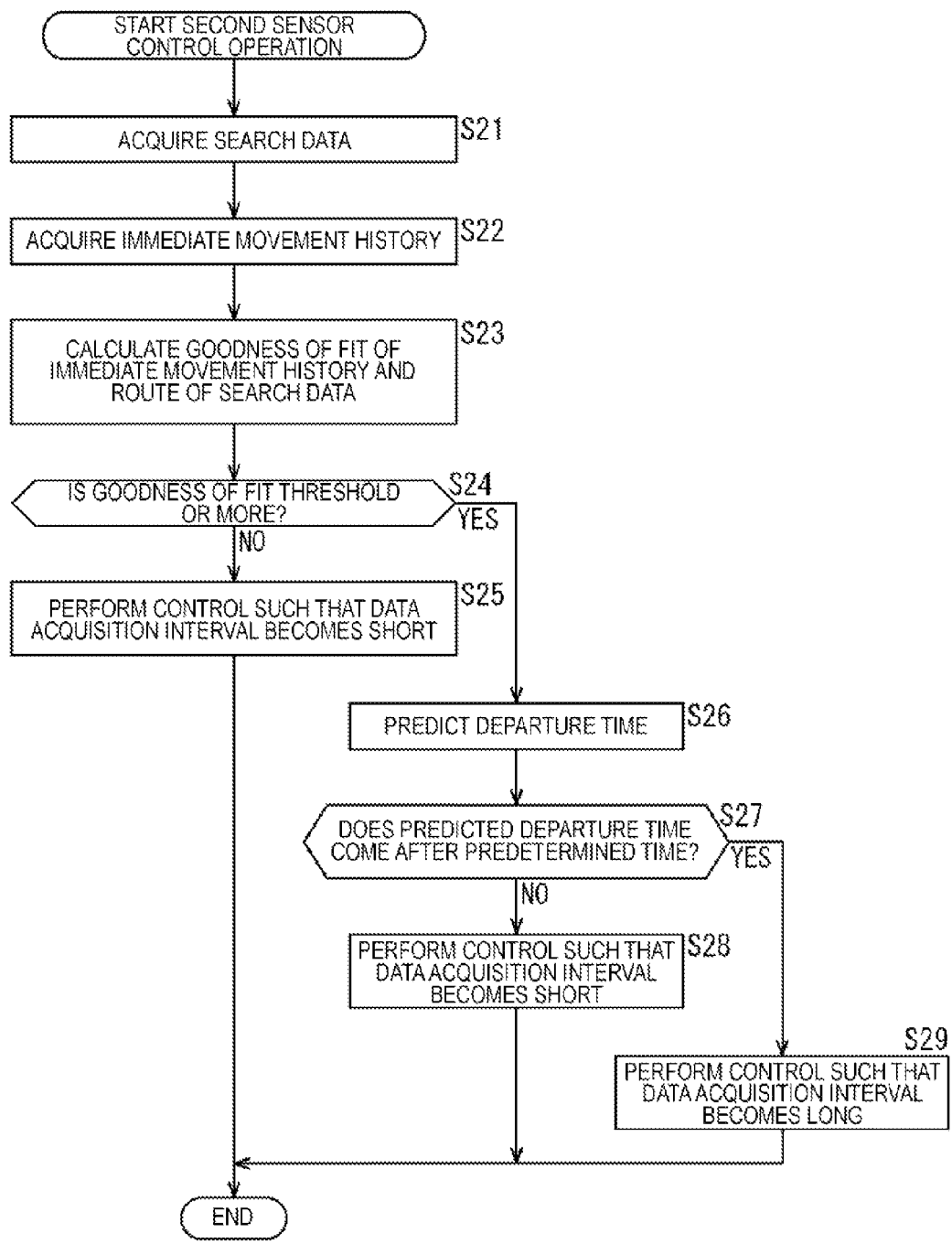
FIG. 4 is a flowchart for explaining a second sensor control operation.

FIG. 4 is a flowchart of the second sensor control operation of controlling the data acquisition interval of the position sensor unit 11 based on the known or unknown determination result and the predicted departure time.

Steps S21 to S25 in FIG. 4 are the same as steps S11 to S15 in FIG. 3, and therefore will not be described.

When it is determined in step S24 that goodness of fit of the immediate movement history and the route of search data is a predetermined threshold or more, the operation moves to step S26, and the departure time prediction unit 17 predicts the departure time which is a time to depart from the current place as the absolute time or the relative time. The predicted departure time which is a prediction result of the departure time prediction unit 17 is supplied to the sensor control unit 19.

Further, in step S27, the sensor control unit 19 determines whether or not the predicted departure time supplied from the departure time prediction unit 17 comes after the predetermined time.

When it is determined in step S27 that the predicted departure time does not come after the predetermined time, that is, the departure time comes soon like during movement, the operation moves to step S28, and the sensor control unit 19 performs control such that the data acquisition interval becomes short.

Meanwhile, when it is determined in step S27 that the predicted departure time comes after the predetermined time, that is, there is an extra time to the departure time, the operation moves to step S29, and the sensor control unit 19 performs control such that the data acquisition interval becomes short.

The operation in FIG. 4 is repeatedly executed.

As described above, in the second sensor control operation, even when the immediate movement route is known, that is, for example, during movement, the data acquisition interval is set short, and, when the user does not move from a current place for a while, that is, when, for example, the user is staying at a destination or waiting for a train, the data acquisition interval is set long.

By this means, it is possible to make the data acquisition interval long when search data is unnecessary and, consequently, accumulate sufficient movement history data with a little power consumption.

In addition, although the data acquisition interval is set to two stages of a short setting time (for example, one minute) and a long setting time (for example, five minutes), the data acquisition interval may be divided into three stages or more.

Flowchart of Data Correction Operation

Figure 5:
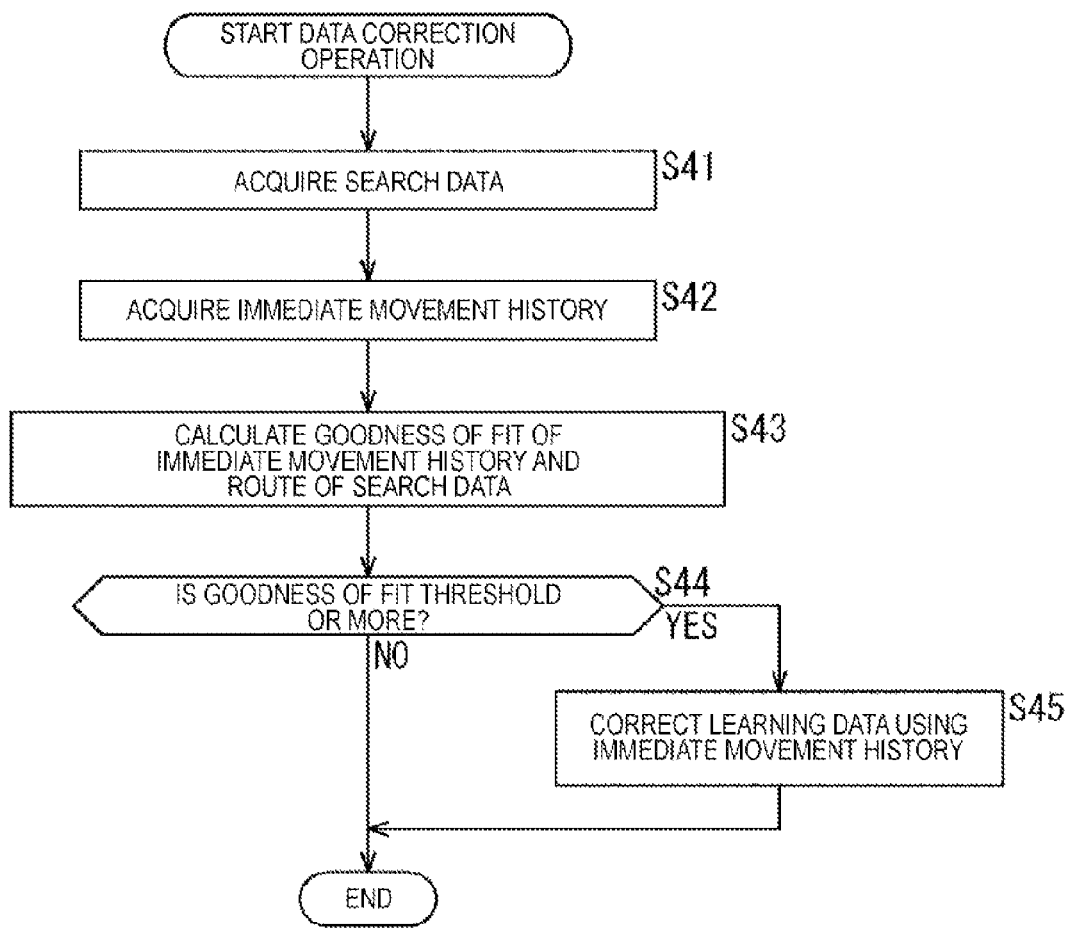
FIG. 5 is a flowchart for explaining a data correction operation.

FIG. 5 is a flowchart of a data correction operation performed by the prediction device 1 in FIG. 1.

The operations in steps S41 to S44 in FIG. 5 are the same as steps S1 to S4 in FIG. 1 and steps S11 to S14 in FIG. 2, and therefore will not be described. That is, as to the operations in steps S41 to S44, one operation is commonly used between the prediction operation, the sensor control operation and the data correction operation.

In step S44, when it is determined that the goodness of fit of the immediate movement history and the route of search data is less than a predetermined threshold, the data correction operation is finished. That is, when the immediate movement history is an unknown route, search data is not accumulated, and correction cannot be performed and therefore the operation is finished.

Meanwhile, when it is determined in step S44 that the goodness of fit of the immediate movement history and the route of search data is a predetermined threshold or more, the operation moves to step S45, and the DB correction unit 20 corrects the immediate movement history using the search data. Further, the DB correction unit 20 supplies the corrected immediate movement history to the past history DB 13, and finishes the operation.

The operation in FIG. 5 is repeatedly executed.

As described above, in the data correction operation, it is possible to correct the immediate movement history based on the search data and supply the immediate movement history to the past history DB 13 and, consequently, improve precise data (search data) accumulated as the past movement history.

An outline of the operations of the prediction device 1 in FIG. 1 has been described above with reference to FIGS. 1 to 5.

The prediction device 1 in FIG. 1 can execute the prediction operation, the sensor control operation and the data correction operation according to different methods depending on how search data is stored in the past history DB 13.

One is a method of storing route logs which are acquired time, latitude and longitude time series data as search data in the past history DB 13 and using the route logs. Another method is a method of storing a learning model which learns acquired time, latitude and longitude time series data as search data in the past history DB 13 and using the learning model. For the learning model, for example, a stochastic transition model is adopted.

A method performed using route logs will be described as the first embodiment of the prediction device 1, and a method performed using a learning model will be described as a second embodiment of the prediction device 1.

2. First Embodiment

Example Structure of Prediction Device 1 According to First Embodiment

Figure 6:
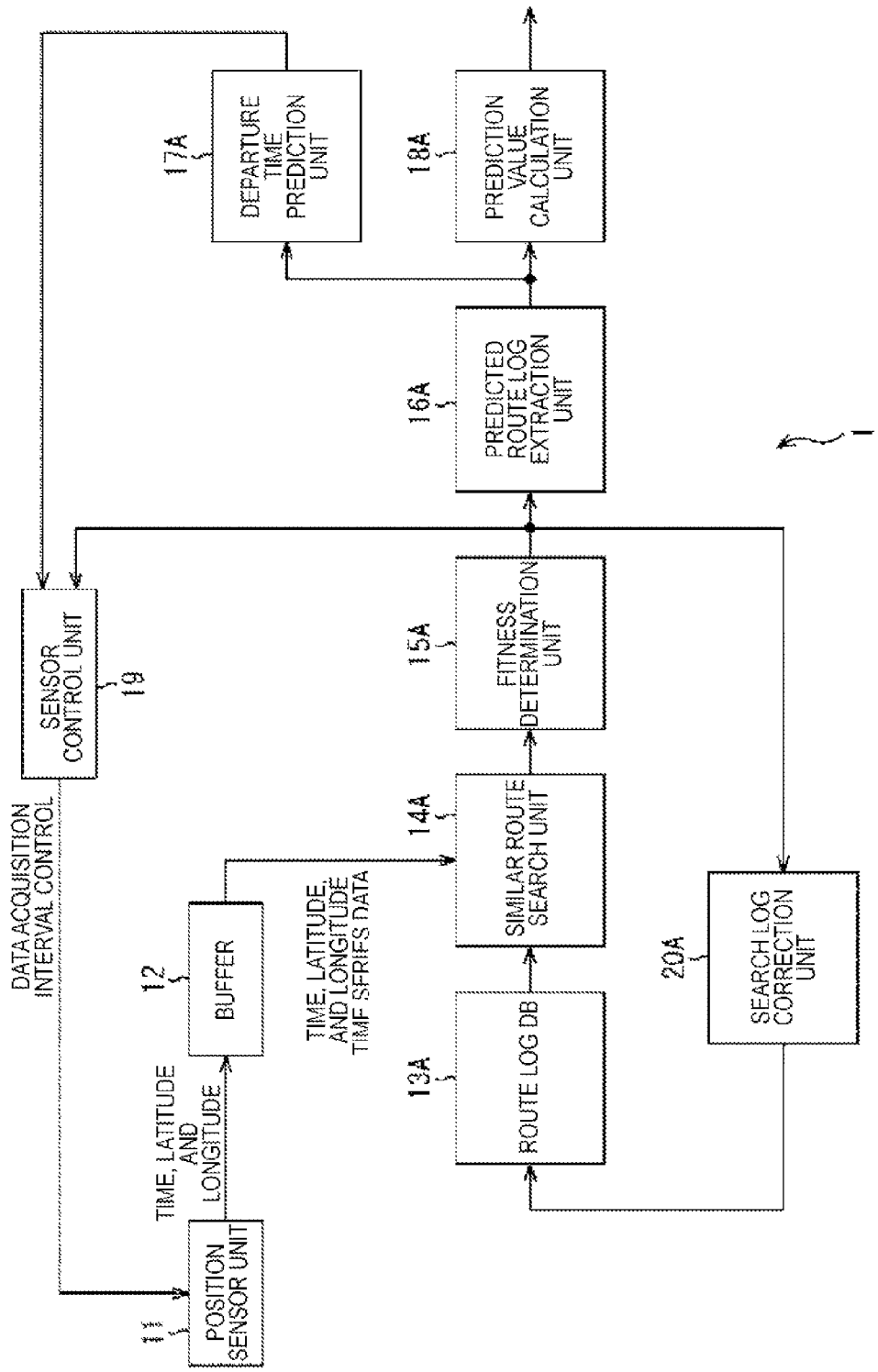
FIG. 6 is a block diagram illustrating an example structure of a first embodiment of the prediction device.

FIG. 6 is a block diagram illustrating an example structure of a prediction device 1 according to a first embodiment.

A route log DB 13A, a similar route search unit 14A, a fitness determination unit 15A, a predicted route log extraction unit 16A, a departure time prediction unit 17A, a prediction value calculation unit 18A and a search log correction unit 20A in FIG. 6 corresponds to a past history DB 13, a similarity search unit 14, a fitness determination unit 15, a predicted route extraction unit 16, a departure time prediction unit 17, a prediction value calculation unit 18 and a DB correction unit 20 in FIG. 1.

The route log DB 13A stores a past movement history and a destination list.

FIG. 7 is a view illustrating a data example of a past movement history stored in the route log DB 13A. As illustrated in FIG. 7, the acquired times and positions (longitude and latitude) are stored in acquisition order of time. The acquisition interval is a predetermined time interval controlled by the sensor control unit 19.

In addition, the position sensor unit 11 cannot acquire position data at fixed intervals in some cases. When, for example, a user is in a tunnel or in an underground, a satellite cannot be captured, and an acquisition interval becomes long. In such a case, for example, acquisition intervals are interpolated as equal intervals by linear interpolation, and stored. In a past movement history, serial numbers are assigned in order of older acquisition times and stored.

Figures 8, 9:
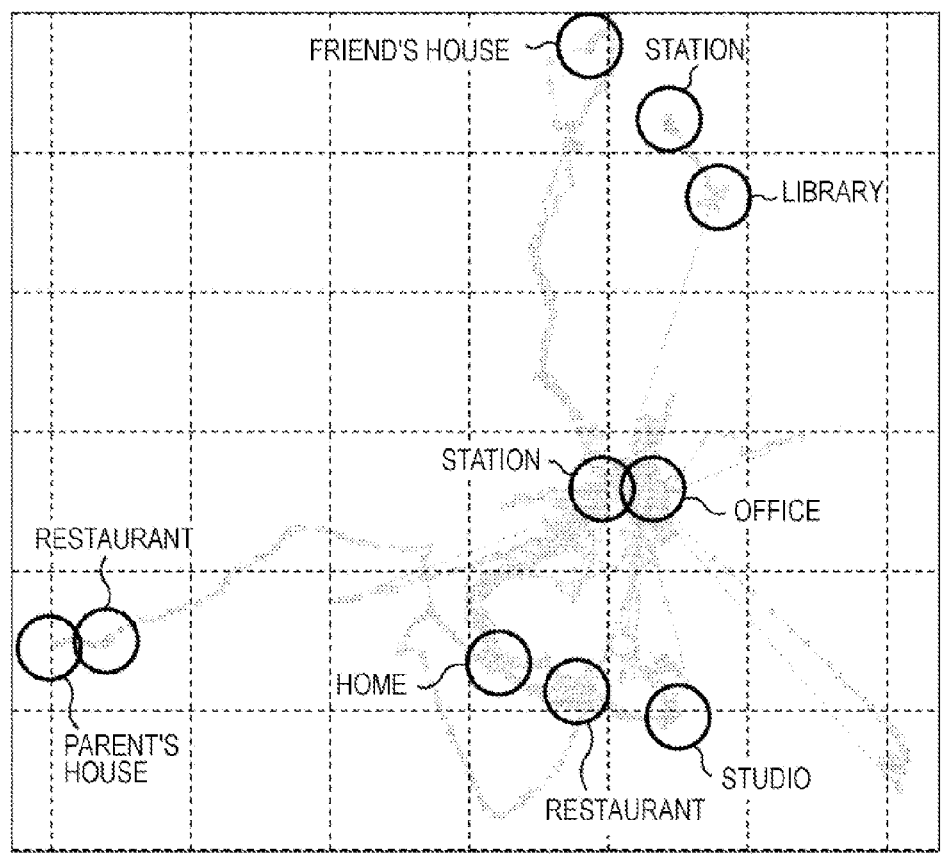
FIG. 8 is a view illustrating an example of a destination list.
FIG. 9 is a view illustrating the past movement history and destinations.

FIG. 8 is a view illustrating an example of a destination list stored in the route log DB 13A.

The destination list includes indices sequentially assigned to the destinations, and the positions of the destinations (the longitudes and the latitudes).

FIG. 9 is a view illustrating a past movement history stored in the route log DB 13A and destinations listed in the destination list, on a map.

In FIG. 9, centers of positions encircled by circles (○), and gray points connecting these destinations are a plotted past movement history.

Back to FIG. 6, the similar route search unit 14A scans the past movement history of the route log DB 13A, and calculates the similarity of the immediate movement history and each site (position) of the past movement history supplied from the buffer 12.

The similar route search unit 14A calculates a similarity D(i) of an i-th site of the past movement history and the immediate movement history according to next equation (1).

[Mathematical Formula 1]

$$D(i) = -\sum_{k=0}^{K-1} \text{Distance}(x_{i-k}^{past}, x_{t-k}^{current}) \qquad (1)$$

$x^{past}$ in equation (1) represents a past movement history, and $x^{current}$ represents an immediate movement history. A lower right index is a serial number of a past movement history or an immediate moment history. Further, Distance (x, y) in equation (1) is a function of calculating a distance between two sites x and y, and can be an Euclidean distance, an urban area distance (a sum of components of differential vectors in the orthogonal direction) and a square of these distances. Σ represents a sum of K steps.

Hence, the similarity D(i) in equation (1) is position data K steps of the immediate movement history supplied from the buffer 12, and corresponds to distance (total sum) between corresponding steps of the immediate movement history of the K steps and the movement history of steps tracking back past K steps from the i-th step in the past movement history.

In addition, equation (1) is multiplied with minus to make a value of the similarity D(i) higher when similarity is higher.

The similarity D(i) in equation (1) may take an average of distances by dividing the sum of the K steps by the number of steps K.

In addition, the method of calculating the similarity D(i) is not limited to this. For example, an immediate site and another site of a predetermined time before may be selected from the immediate movement history, two sites which are close to the two selected immediate sites and are in an interval of about a predetermined time may be detected from the past movement history, and may use a distance between the two detected sites and sites corresponding to the two immediate two sites.

The similar route search unit 14A calculates the similarity D(i) in equation (1) as goodness of fit, and supplies the goodness of fit to the fitness determination unit 15A.

The fitness determination unit 15A determines the goodness of fit of each site of the past movement history and the immediate movement history calculated by the similar route search unit 14A is a predetermined threshold or more, and determines there is the past movement history which fits to the acquired immediate movement history.

The predicted route log extraction unit 16A extracts a movement history reaching to one of destinations of the destination list of the route log DB 13A as a predicted route for sites of the past movement history detected to have a predetermined threshold or more. A plurality of sites of the past movement history detected to have a predetermined threshold or more is detected.

The predicted route log extraction unit 16A lists up a reachable destination from an extracted predicted route per destination based on the destination list of the route log DB 13A.

The prediction value calculation unit 18A calculates a route list to a destination, a typical route, a reach probability and a required time per listed up destination.

For the typical route to the destination, for example, the typical route of the shortest required time in the extracted route list to the destination is adopted. In addition, the predicted route which is the closest to an average required time of a plurality of extracted predicted routes may be the typical route.

The reach probability of the destination can be calculated by using the total number of extracted predicted routes as a denominator and the total number of reachable predicted routes to the destination as a numerator.

The required time to the destination is an average value of the required time of a predicted route to this destination. In addition, the required time to the destination may be calculated as an average value from which a predicted route of an obvious abnormal value is removed.

Figure 10:
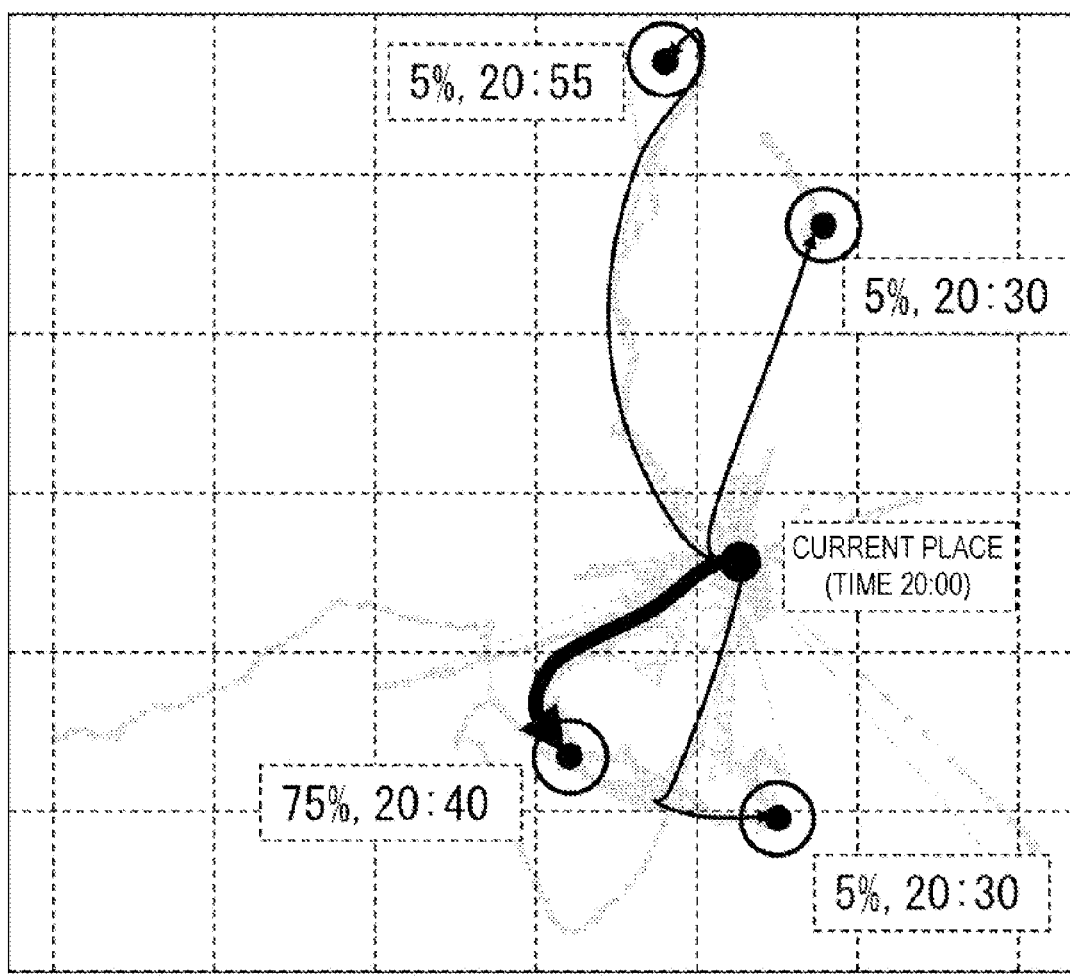
FIG. 10 is a view illustrating a prediction result of a prediction value calculation unit.

FIG. 10 illustrates an example illustrating each destination obtained by the prediction value calculation unit 18A, and a reach probability and a required time to each destination on a map.

Back to FIG. 6, the departure time prediction unit 17A calculates an absolute or relative departure time from one or more predicted routes which are extracted by the predicted route log extraction unit 16A and which start from a site having goodness of fit equal to or more than a predetermined threshold, and supplies the departure time to the sensor control unit 19.

To calculate the absolute departure time, the departure time prediction unit 17A calculates an average value of past times to depart from a setting range for the first time by setting a predetermined range (for example, a radius 100 m) around the starting point as the setting range, and sets the average value as the absolute departure time.

To calculate the relative departure time, the departure time prediction unit 17A calculates how many steps (time) the user stays in the setting range by setting the predetermined range (for example, the radius 100 m) around the starting point as the setting range, and sets this average value as the relative departure time (predicted sojourn time).

The absolute time is suitable to prediction in case that the user has a habit of going to and leaving from an office, and a time zone of a behavior has regularity. Meanwhile, the relative time is suitable to prediction when a user goes out on a holiday (shopping or hair cutting), and a time zone of an action does not have regularity.

The search log correction unit 20A corrects the immediate movement history using the past movement history detected to have a predetermined threshold or more, and supplies the corrected immediate movement history to the route log DB 13A.

Correction of an immediate movement history performed by the search log correction unit 20A will be described with reference to FIG. 11.

The search log correction unit 20A searches in the route log DB 13A the past movement history which starts from a site of the past movement history detected to have a predetermined threshold or more and which has the same number of steps (K step) as those of the immediate movement history, and clips the past movement history as search data.

Further, the search log correction unit 20A calculates the average value of one or more items of clipped search data per step, and generates an ideal sequence. Furthermore, the search log correction unit 20A calculates an average of the ideal sequence and the immediate movement history, and generates the corrected immediate movement history.

Figure 11:
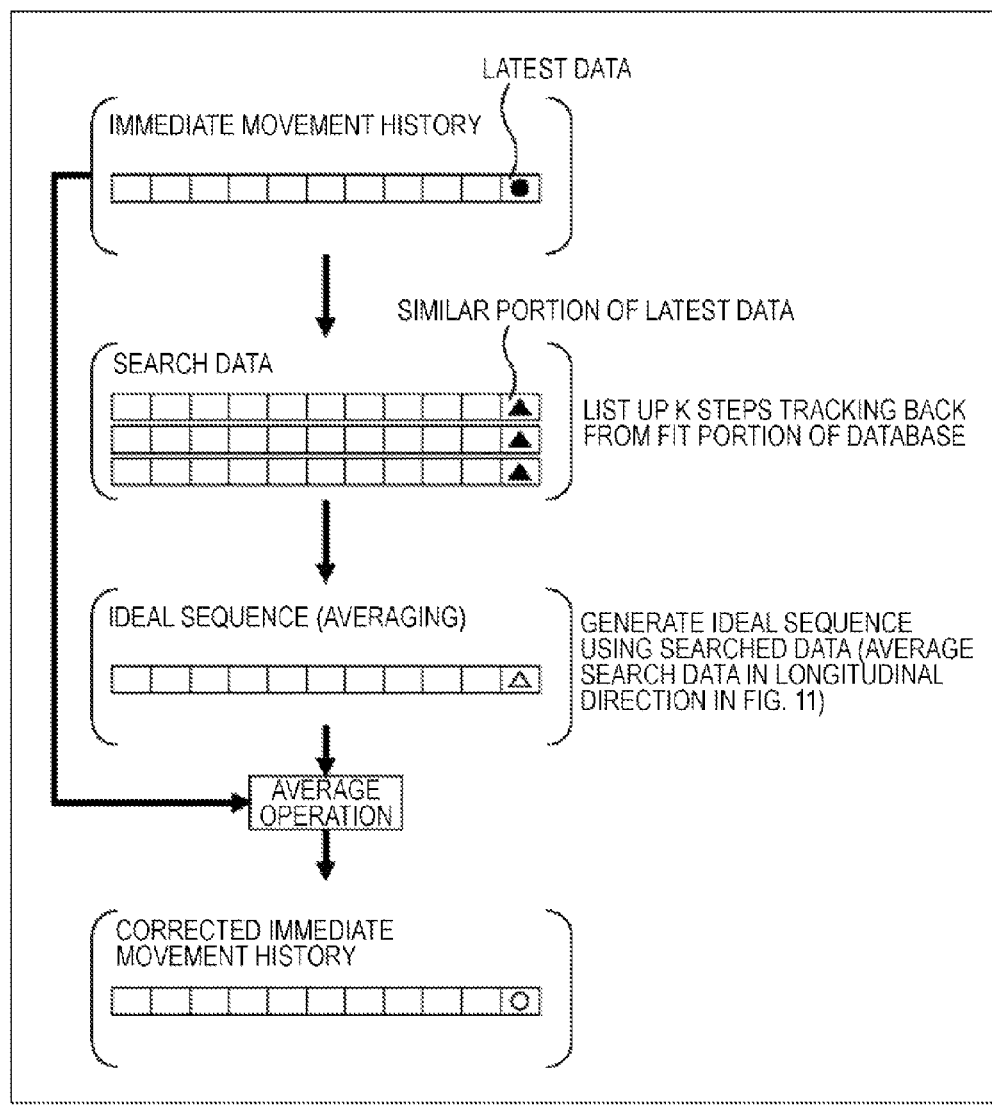
FIG. 11 is a view for explaining correction of an immediate movement history.

In FIG. 11, a black circle (●) of the immediate movement history is latest position data (site), and black triangles (▲) of search data are sites (starting points) of the past movement history corresponding to the latest position data. Similarly, a white triangle (Δ) of the ideal sequence and a white circle (○) of the corrected movement history are also sites corresponding to the latest position data of the immediate movement history.

In addition, although the number of steps from the starting point is the same as the number of steps of calculating the similarity in this example, the number of steps may be different from the steps of calculating the similarity.

Further, although the corrected immediate movement history is subjected to a simple average in the above example, the ideal sequence and the immediate movement history may be calculated by a weighted average of setting a higher weight to the ideal sequence. Similarly, to calculate the ideal sequence, the past movement history may be calculated by performing a weighted average of setting a lower weight.

According to this correction operation, it is possible to correct the immediate movement history to the position automatically and statistically subjected to an operation, and accumulate the immediate movement history in the route log DB 13A.

Flowchart of Prediction Operation

The prediction operation according to the first embodiment will be described with reference to a flowchart of FIG. 12.

First, in step S61, the similar route search unit 14A acquires the past movement history and the destination list from the route log DB 13A.

In step S62, the similar route search unit 14A acquires the immediate movement history from the buffer 12.

In step S63, the similar route search unit 14A scans the past movement history, and calculates goodness of fit of each site (position) of the past movement history and the immediate movement history. Meanwhile, for example, the similarity D(i) in equation (1) is adopted for goodness of fit.

In step S64, the fitness determination unit 15A determines whether or not there is one or more sites having goodness of fit equal to or more than a predetermined threshold, based on goodness of fit calculated by the similar route search unit 14A.

When it is determined in step S64 that there is not even one site having goodness of fit equal to or more than a predetermined threshold, the prediction operation is finished. Meanwhile, when it is determined in step S64 that there is one or more sites having goodness of fit equal to or more than a predetermined threshold, the operation moves to step S65.

In step S65, the predicted route log extraction unit 16A selects a site having goodness of fit equal to or more than the predetermined threshold.

Further, in step S66, the predicted route log extraction unit 16A extracts as the predicted route the past movement history from a selected site to one of destinations for a site which is selected (selected site).

In step S67, the predicted route log extraction unit 16A lists up a reachable destination from the extracted predicted route per destination based on the destination list of the route log DB 13A.

Further, in step S68, the prediction value calculation unit 18A calculates a route list and a typical route to the destination per listed up destination. For the typical route, for example, a predicted route of the shortest required time is adopted from a plurality of predicted routes to the destination.

The prediction value calculation unit 18A calculates the reach probability to each destination in step S69, and calculates and outputs a required time to each destination in step S70 and finishes operation.

Flowchart of Second Sensor Control Operation Using Absolute Predicted Departure Time Next, the second sensor control operation according to the first embodiment using the absolute predicted departure time will be described with reference to a flowchart in FIG. 13.

Figure 12:
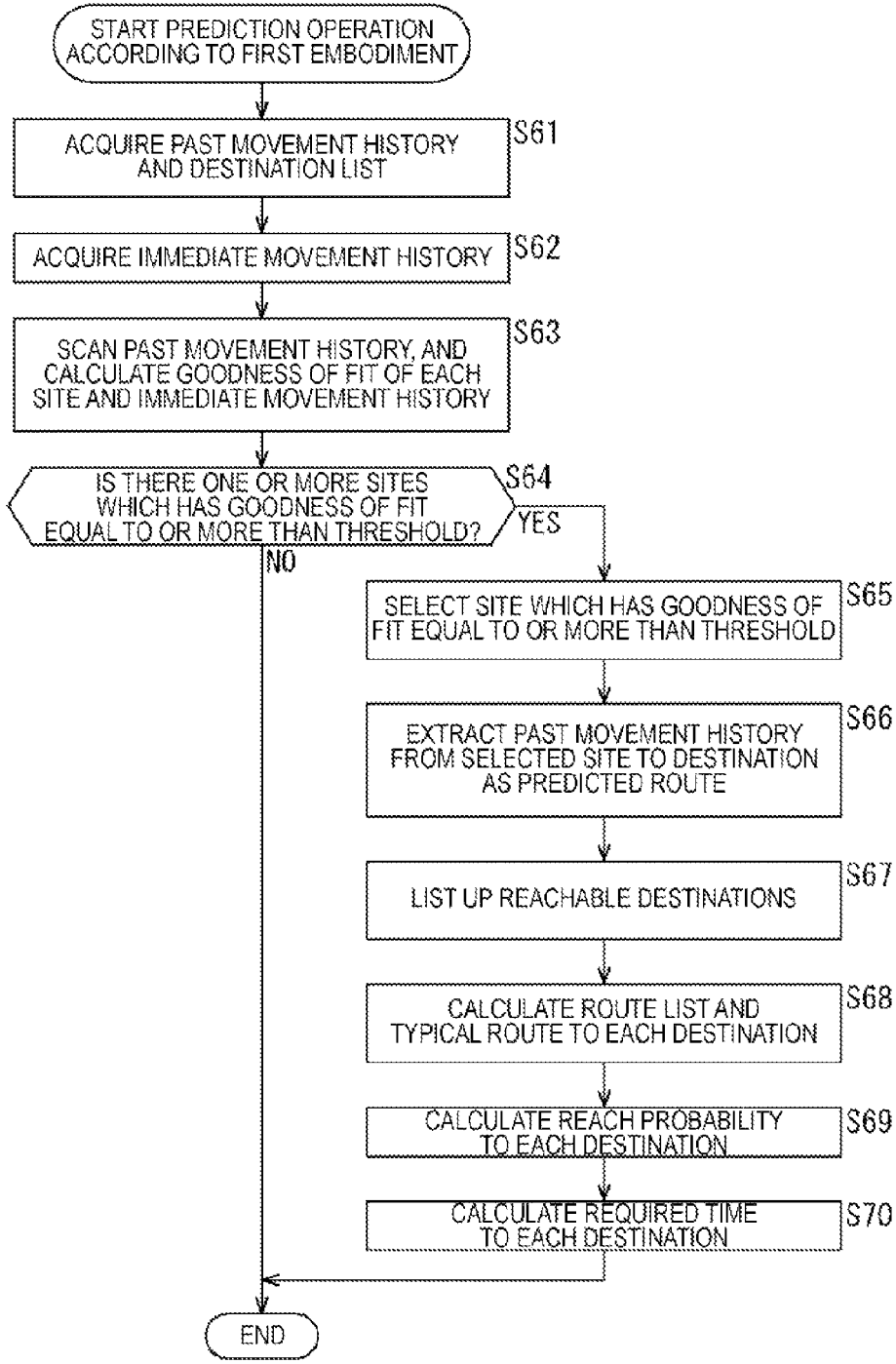
FIG. 12 is a flowchart for explaining the prediction operation according to the first embodiment.
Figure 13:
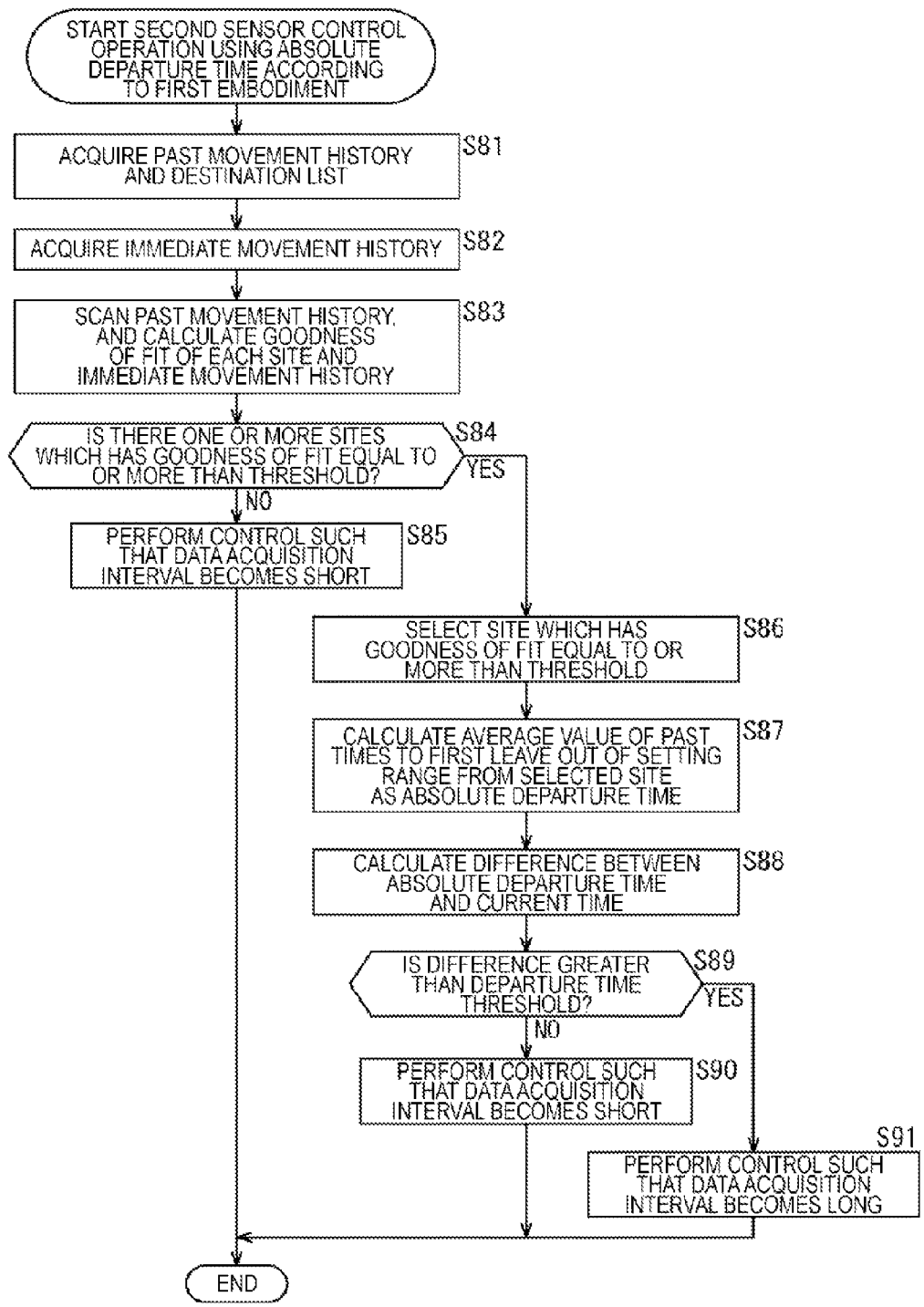
FIG. 13 is a flowchart for explaining the second sensor control operation using an absolute predicted departure time according to the first embodiment.

Steps S81 to S84 in FIG. 13 are the same as steps S61 to S64 in FIG. 12, and therefore will not be described.

When it is determined in step S84 that there is not even one site having goodness of fit equal to or more than a predetermined threshold, the operation moves to step S85, and the sensor control unit 19 controls the position sensor unit 11 such that the data acquisition interval becomes short and finishes the operation.

Meanwhile, when it is determined in step S84 that there is one or more sites having goodness of fit equal to or more than a predetermined threshold, the operation moves to step S86, and the predicted route log extraction unit 16A selects a site having goodness of fit equal to or more than a predetermined threshold.

In step S87, the departure time prediction unit 17A calculates an average value of past times to first leave outside a setting range, from the selected site having goodness of fit equal to or more than the predetermined threshold, and sets the average value as the absolute departure time. The calculated absolute departure time is supplied to the sensor control unit 19.

In step S88, the sensor control unit 19 calculates a difference between the absolute departure time supplied from the departure time prediction unit 17A, and a current time.

Further, in step S89, the sensor control unit 19 determines whether or not the calculated difference is greater than the predetermined threshold (hereinafter, referred to as a "departure time threshold").

When it is determined in step S89 that the calculated difference is the departure time threshold or less, the operation moves to step S90, and the sensor control unit 19 performs control such that the data acquisition interval becomes short and finishes the operation.

When it is determined in step S89 that the calculated difference is greater than the departure time threshold, the operation moves to step S91, and the sensor control unit 19 performs control such that the data acquisition interval becomes short and finishes the operation.

The first sensor control operation according to the first embodiment skips is an operation from which above steps S86 to S90 are removed.

Flowchart of Second Sensor Control Operation Using Relative Predicted Departure Time Next, the second sensor control operation according to the first embodiment using the relative predicted departure time will be described with reference to a flowchart in FIG. 14.

Figure 14:
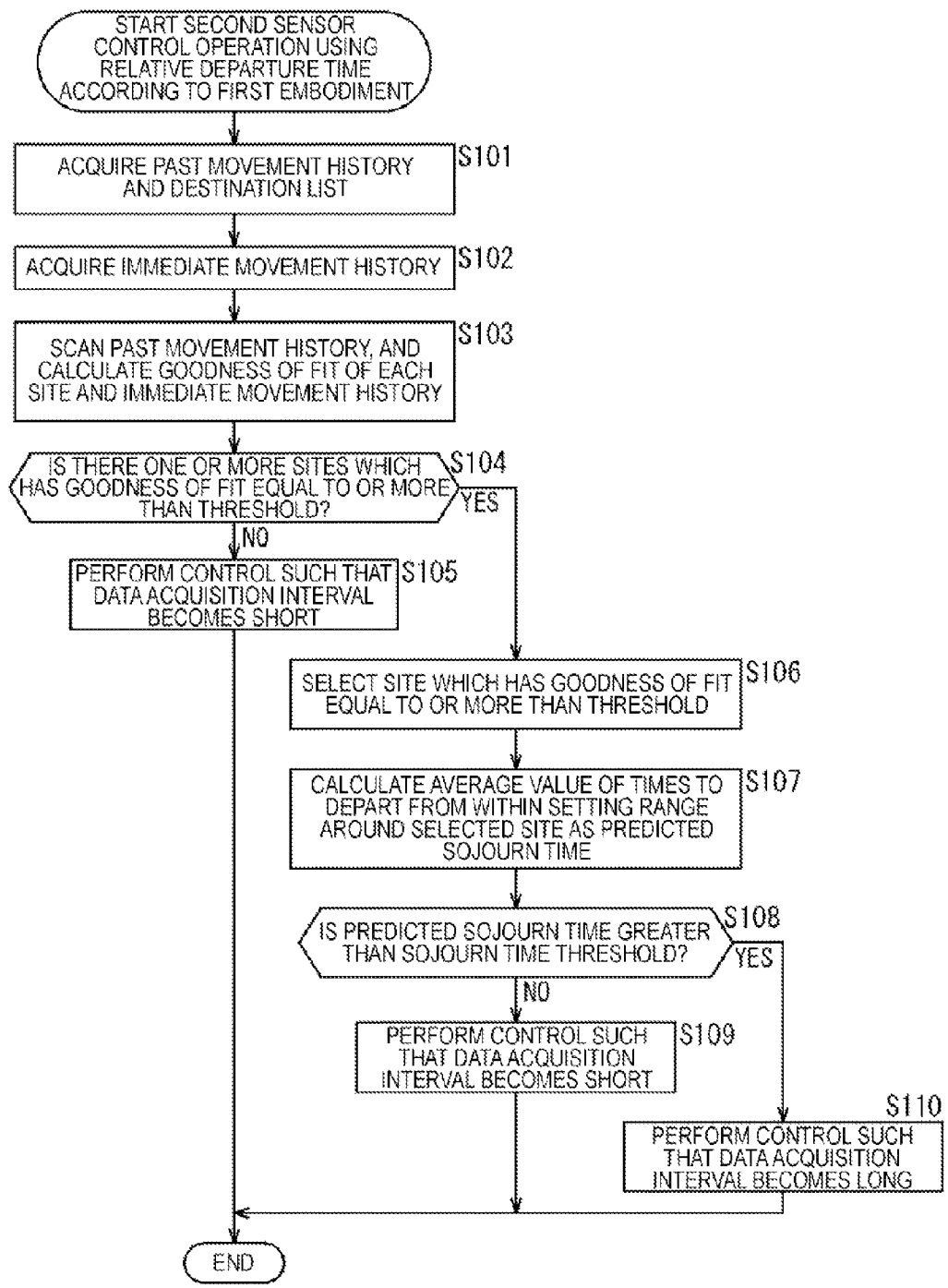
FIG. 14 is a flowchart for explaining the second sensor control operation using a relative predicted departure time according to the first embodiment.

The second sensor control operation using the relative predicted departure time in FIG. 14 differs from the second sensor control operation using the absolute predicted departure time in FIG. 13 only in steps S107 and S108 corresponding to steps S87 to S89 in FIG. 13. Hence, only the operations in steps S107 and S108 in FIG. 14 will be described, and the other operations will not be described.

In step S107, the departure time prediction unit 17A calculates an average value of times (the number of steps) to depart from a setting range around the selected range as a predicted sojourn time.

In step S108, the departure time prediction unit 17A determines whether or not the calculated predicted sojourn time is greater than a predetermined time (hereinafter, referred to as a "sojourn time threshold").

When it is determined in step S108 that the calculated predicted sojourn time is the sojourn time threshold or less, the operation moves to step S109.

Meanwhile, when it is determined in step S108 that the calculated predicted sojourn time is greater than the sojourn time threshold value, the operation moves to step S110.

In step S109 or S110, a predetermined data acquisition interval is set to the sensor control unit 19, and the operation is finished.

Although the second sensor control operation using the absolute predicted departure time or the second sensor control operation using the relative predicted departure time is performed as described above, a final data acquisition interval may be determined based on a result obtained by combining processing results of both operations.

Flowchart of Data Correction Operation

The data correction operation according to the first embodiment will be described with reference to a flowchart of FIG. 15.

Figure 15:
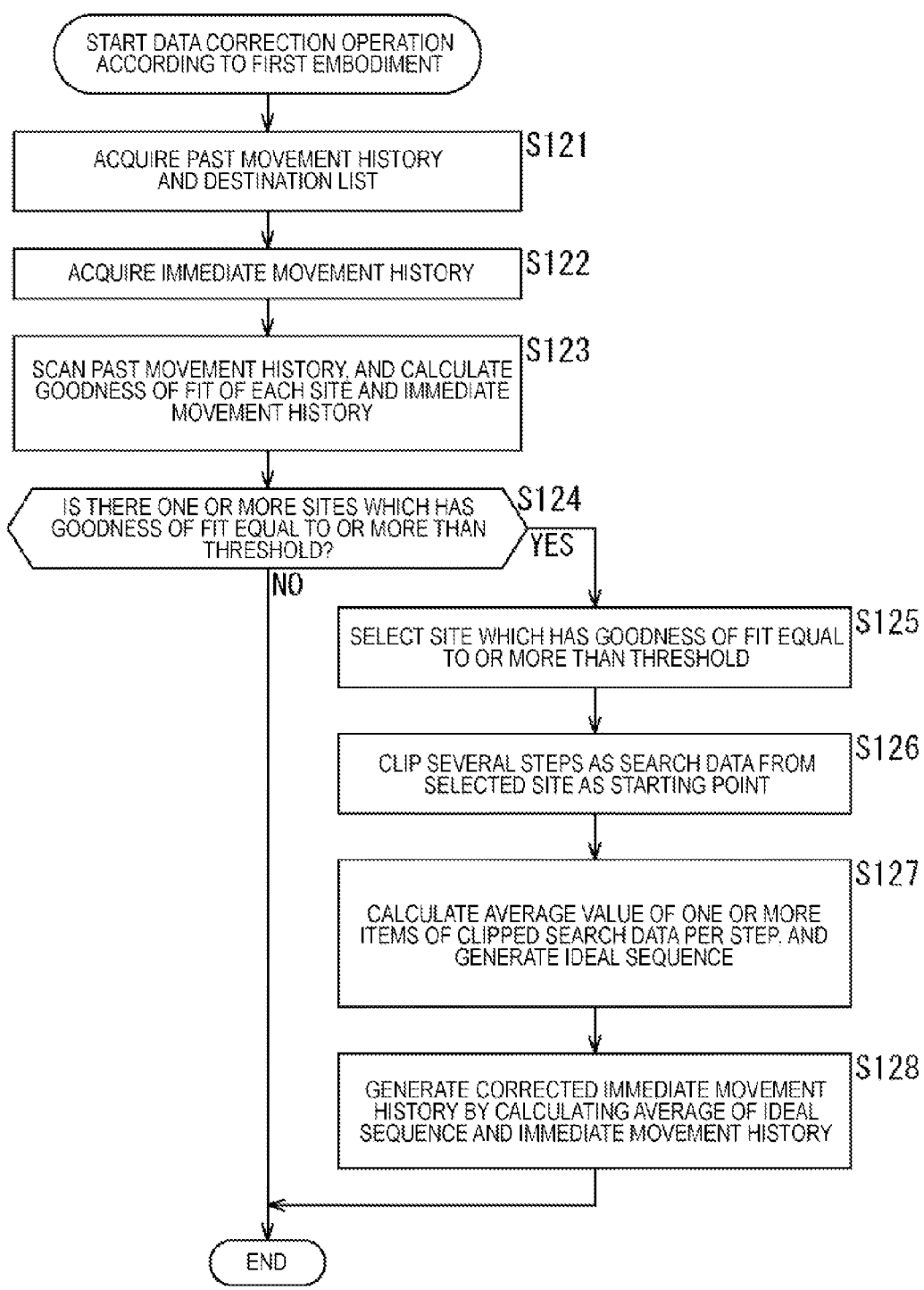
FIG. 15 is a flowchart for explaining the data correction operation according to the first embodiment.

Steps S121 to S125 in FIG. 15 are the same as steps S61 to S65 in FIG. 12, and therefore will not be described.

In step S126, the search log correction unit 20A searches in the route log DB 13A the past movement history which starts from the selected site and which has the same number of steps (K steps), and clips the past movement history as search data. By this means, one or more items of search data is clipped.

In step S127, the search log correction unit 20A calculates an average value of one or more clipped search data per step, and generates the ideal sequence.

In step S128, the search log correction unit 20A generates the corrected immediate movement history by calculating an average of the ideal sequence and the immediate movement history, and finishes the operation.

As described above, the prediction device 1 according to the first embodiment can perform the prediction operation, the sensor control operation and the data correction operation using the route log stored in the past history DB 13.

3. Second Embodiment

Example Structure of Prediction Device 1 According to Second Embodiment

Figure 16:
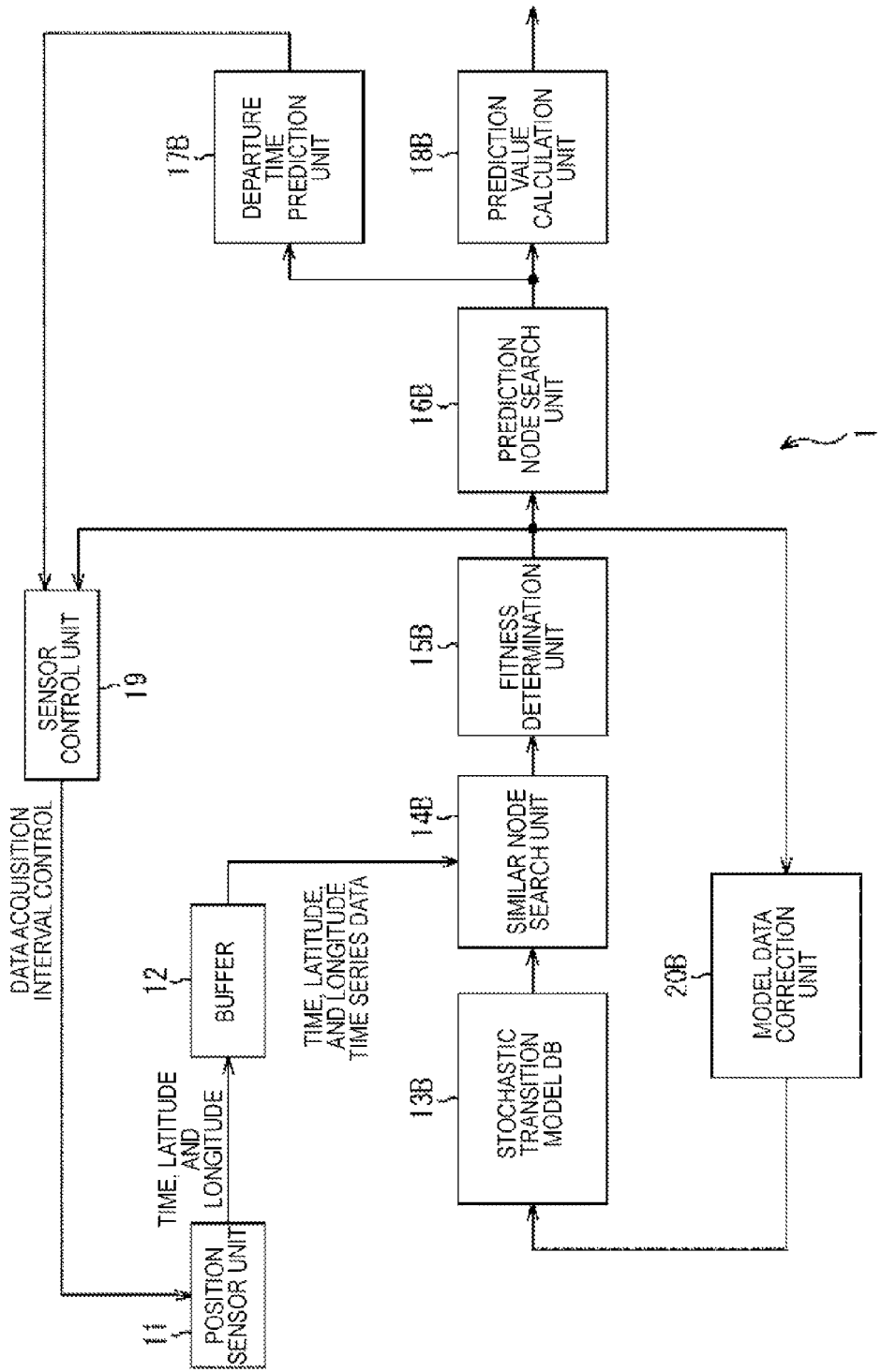
FIG. 16 is a block diagram illustrating an example structure of a second embodiment of a prediction device.

FIG. 16 is a block diagram illustrating an example structure of the prediction device 1 according to a second embodiment. A stochastic transition model DB 13B, a similar node search unit 14B, a fitness determination unit 15B, a prediction node search unit 16B, a departure time prediction unit 17B, a prediction value calculation unit 18B and a model data correction unit 20B in FIG. 16 correspond to a past history DB 13, a similarity search unit 14, a fitness determination unit 15, a predicted route extraction unit 16, a departure time prediction unit 17, a prediction value calculation unit 18 and a DB correction unit 20 in FIG. 1.

The stochastic transition model DB 13B stores a result obtained by learning a past movement history according to a stochastic transition model as a learning model. In other words, the stochastic transition model DB 13B stores as search data a parameter obtained by learning the past movement history according to the stochastic transition model as the learning model.

Further, the stochastic transition model DB 13B receives a supply of a new movement history from the model data correction unit 20B, and the stochastic transition model DB 13B updates and stores the parameter of the stochastic transition model using the new movement history at a predetermined timing (for example, every other day or every other week).

Furthermore, the stochastic transition model DB 13B also stores a destination list similar to the route log DB 13A according to the first embodiment.

Figure 17:
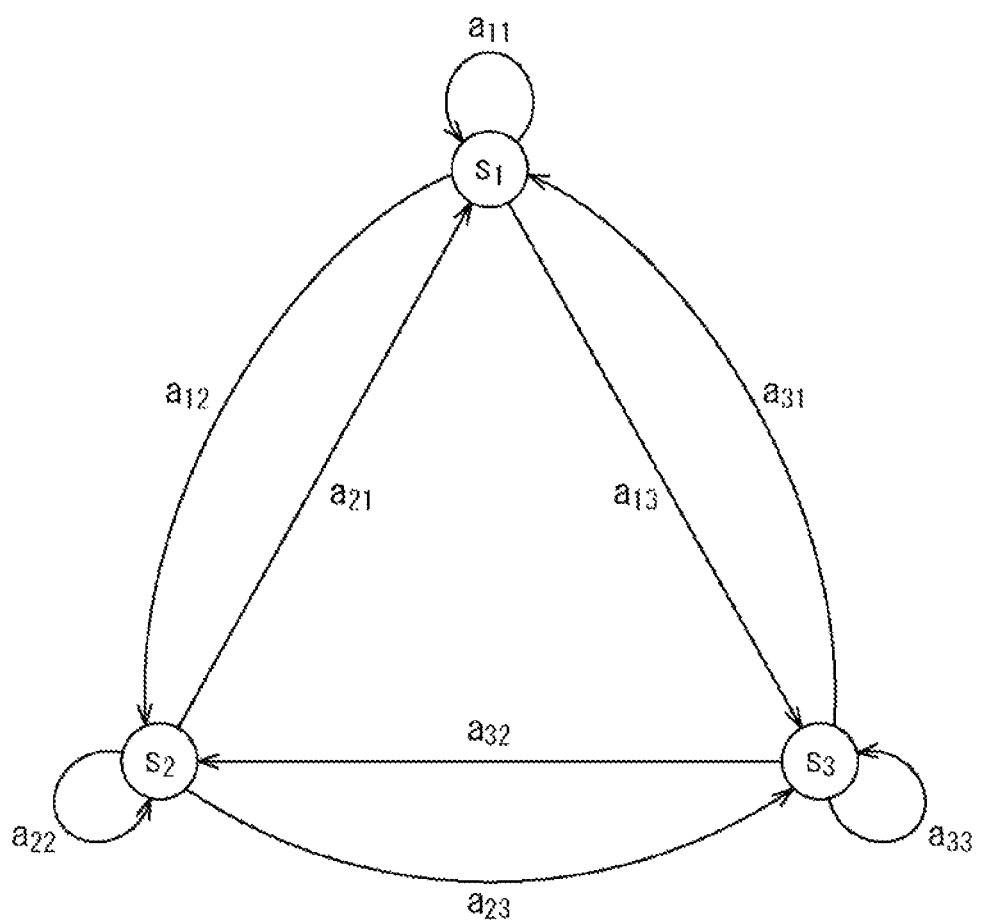
FIG. 17 is a conceptual diagram of a stochastic transition model.

FIG. 17 is a conceptual diagram of a stochastic transition model for learning a past movement history.

The stochastic transition model illustrated in FIG. 17 indicates a hidden Markov model in which the number of statuses is 3 (N=3). The HMM is formed with a plurality of discretized status nodes $s_i$.

More specifically, the HMM is represented by a parameter for determining a status represented by a stochastic variable having a regular distribution and a parameter for determining a status transition for a plurality of discretized status nodes $s_i$. Hereinafter, both of the parameter for determining the status and the parameter for determining status transition will be collectively referred to as a HMM parameter, and a status node will be simply referred to as a status.

The parameter for determining the status includes an observation model of the status node $s_i$, and a center value (average value) $\mu_i$ and a variance $\sigma_i^2$ of the status node $s_i$. The parameter for determining status transition is an internal model of the status node $s_i$, and includes a status transition probability $a_{ij}$ from the status node $s_i$ to the status $s_j$.

FIG. 18 illustrates an example of an observation model and an internal model of each status node of the HMM when the HMM as the learning model learns the past movement history.

The status transition probability $a_{ij}$ as the internal model also includes a self transition probability for transitioning to the status node $s_i$. The center value $\mu_i$ and the variance $\sigma_i^2$ of the status node $s_i$ as the observation model are calculated for the time, the longitude and the latitude. In addition, an initial value which represents an initial status is adequately set to each status node $s_i$ at an initial stage of learning.

Figure 19:
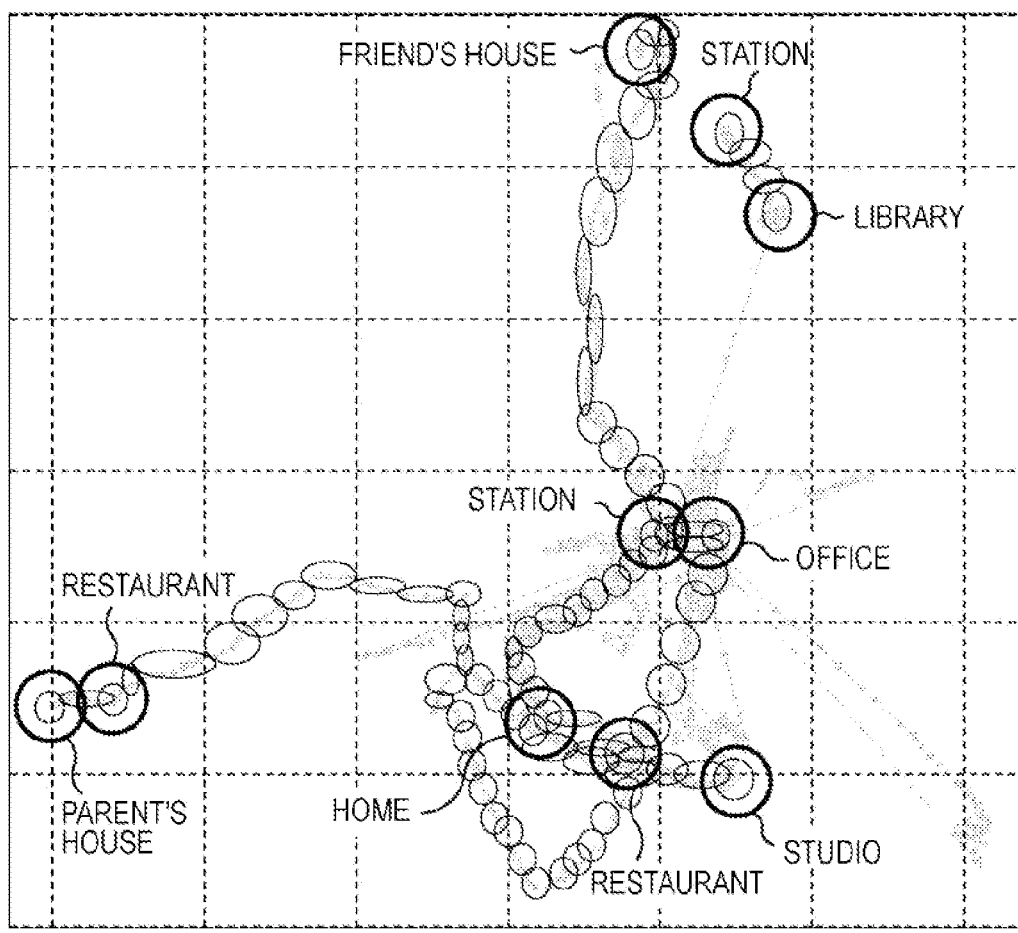
FIG. 19 is a view illustrating learning results obtained when the HMM performs learning, on a map.

FIG. 19 illustrates a view illustrating on a map a learning result obtained when the HMM as the stochastic transition model learns the past movement history and the destination illustrated in FIG. 9. In FIG. 19, ellipses connecting a route indicate each learned status node.

As a method of estimating the HMM parameter, a maximum likelihood estimation method of Baum-Welch is widely used. The maximum likelihood estimation method of Baum-Welch is a method of estimating a parameter based on an EM (Expectation-Maximization) algorithm.

According to the maximum likelihood estimation method of Baum-Welch, the HMM parameter is estimated based on time series data $x=x_1, x_2, \ldots,$ and $x_T$ to be observed such that the likelihood calculated from an occurrence probability which is a probability that this time series data is observed (occurs) maximizes. Meanwhile, $x_t$ represents a signal (sample value) observed at a time t, and T represents a length (the number of samples) of time series data.

The maximum likelihood estimation method of Baum-Welch is disclosed in, for example, "Pattern recognition and learning algorithm", Yoshinori UESAKA and Kazuhiko OZEKI, Bun-ichi Co., Ltd., P. 121.

Back to FIG. 16, the similar node search unit 14B searches for a status node of a stochastic transition model corresponding to the immediate movement history supplied from the buffer 12. In other words, the similar node search unit 14B searches for (selects) the status node which maximizes the status probability of the status node corresponding to the current place (the latest site) of the immediate movement history.

The fitness determination unit 15B determines whether goodness of fit of the status node corresponding to the current place of the immediate movement history is the predetermined threshold or more. A method of calculating the goodness of fit in case that the stochastic transition model will be described. When the goodness of fit of the status node corresponding to the current place of the immediate movement history is the predetermined threshold, a known determination result is supplied to the sensor control unit 19, the prediction node search unit 16B and the model data correction unit 20B. Further, the status node obtained by search is supplied to the prediction node search unit 16B and the model data correction unit 20B. Meanwhile, when the goodness of fit of the status node corresponding to (the current place of) the immediate movement history is less than the predetermined threshold, an unknown determination result is supplied to the sensor control unit 19.

The prediction node search unit 16B searches for the destination by performing tree search on a status node (destination node) of a destination to which a transition can be made, from the status node supplied from the fitness determination unit 15B and corresponding to the current place obtained by search. Further, the prediction node search unit 16B lists up the searched destination per destination.

The prediction value calculation unit 18B calculates a route list, a typical route, a reach probability and a required time to a destination per listed up destination.

The departure time prediction unit 17B calculates an absolute or relative departure time based on the status node corresponding to the current place obtained by search, and supplies the departure time to the sensor control unit 19.

The absolute departure time can be calculated by averaging center values of times of one or more transition destinations other than self transition of the status node corresponding to the current place obtained by search. Alternatively, a departure time which has as a center value a future time which is the closest to the current time from times of transition destinations other than self transition of the status node corresponding to the current place obtained by search may be selected as the absolute departure time.

Further, the relative departure time (predicted sojourn time) can be calculated from a value obtained by multiplying with a time of a unit step following equation (2) which uses a self transition probability of the status node corresponding to the current place obtained by search.

$$t_{stay}=1/(1-a_{ss}) \qquad \text{[Mathematical Formula 2]}$$

In equation (2), $t_{stay}$ represents a predicted sojourn time, and $a_{ss}$ represents a status node obtained by search. In addition, equation (2) spreads when the self transition probability is 1, an upper limit value may be set to the predicted sojourn time.

The model data correction unit 20B corrects the immediate movement history using a status node sequence of the status node corresponding to the immediate movement history, and supplies the corrected immediate movement history to the stochastic transition model DB 13B.

Correction of an immediate movement history performed by the model data correction unit 20B will be described with reference to FIG. 20.

The model data correction unit 20B generates a status node sequence (corresponding node sequence) of a status node corresponding to the immediate movement history, and generates a sequence of a center value of the generated corresponding node sequence as the ideal sequence. Further, the model data correction unit 20B calculates an average of the ideal sequence and the immediate movement history, and the corrected immediate movement history.

Figure 21:
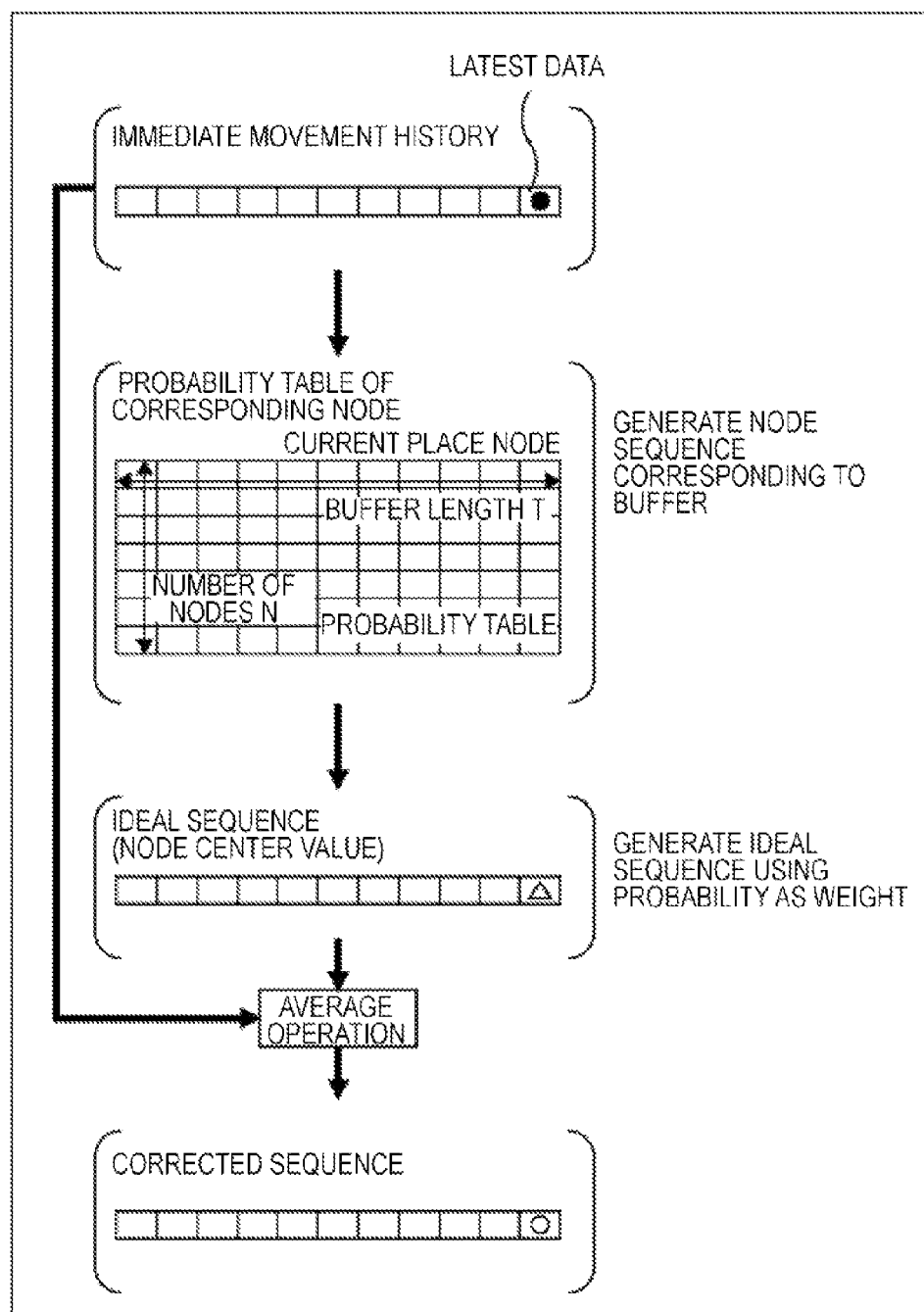
FIG. 21 is a view for explaining correction of another immediate movement history.

FIG. 21 illustrates another correction method of the model data correction unit 20B.

Figure 20:
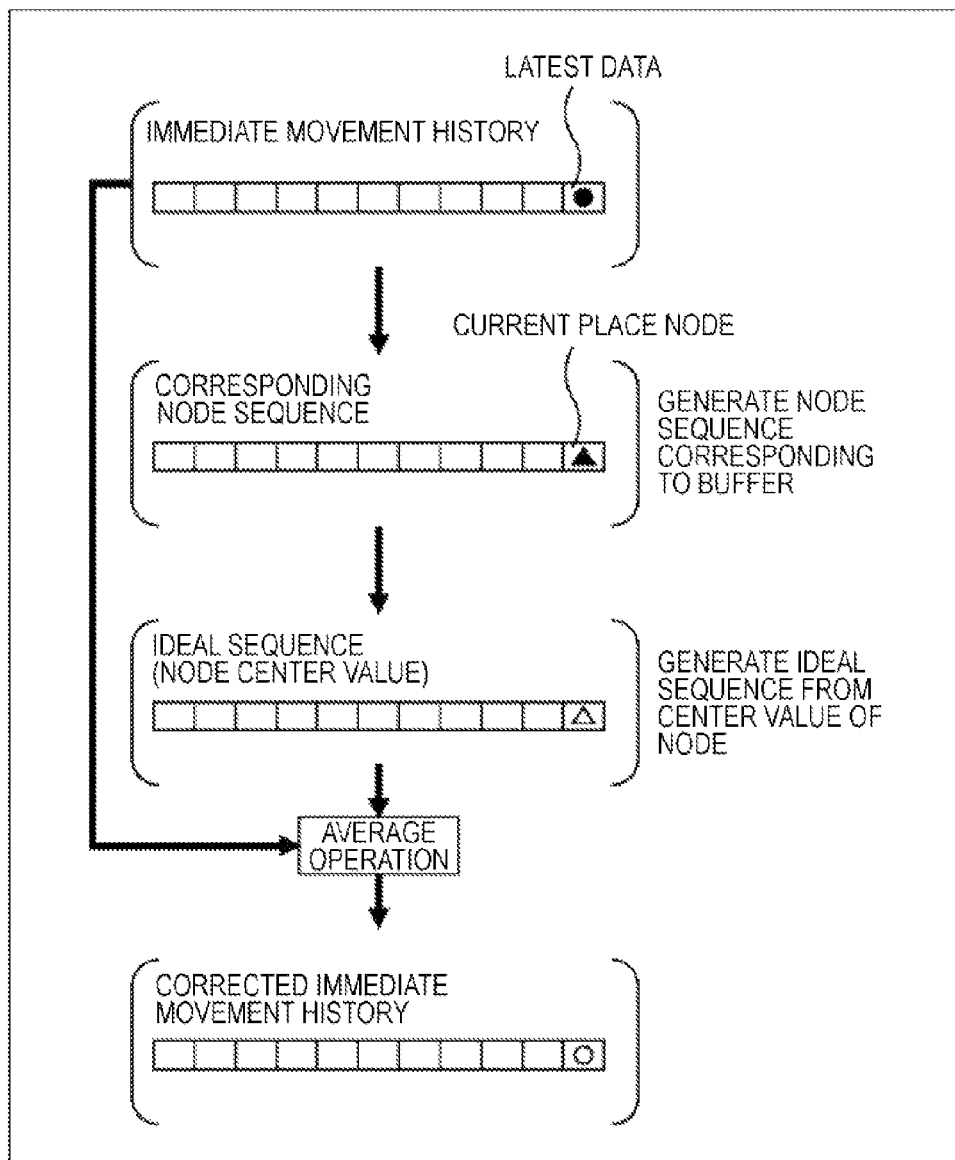
FIG. 20 is a view for explaining correction of an immediate movement history.

The correction method illustrated in FIG. 21 differs from the correction method illustrated in FIG. 20 in using a probability of each status node which forms the stochastic transition model for each step of the immediate movement history. That is, in FIG. 21, a probability $\delta_j(t)$ of each status node for each step of the immediate movement history is indicated as a probability table. A method of calculating the probability $\delta_j(t)$ of each status node for each step of the immediate movement history is calculated according to following equation (5).

The model data correction unit 20B calculates the ideal sequence corresponding to the immediate movement history according to following equation (3) using the probability table.

[Mathematical Formula 3]

$$\langle x_t \rangle = \sum_{j=1}^{N} \delta_j(t) \cdot \mu_j \tag{3}$$

Equation (3) represents that a value obtained by performing a weighted addition on the center values $\mu_j$ of the latitude and longitude of each status node with the probability $\delta_j(t)$ of the status node of each status node for each step of the immediate movement history is a position $\langle x_t \rangle$ of the ideal sequence corresponding to each step of the immediate movement history. Meanwhile, t is the number of steps (serial number) corresponding to an acquisition time of each step of the immediate movement history.

Example Structure of Learning Device

Next, a learning device which learns a stochastic transition model stored in the stochastic transition model DB 13B will be described.

Figure 22:
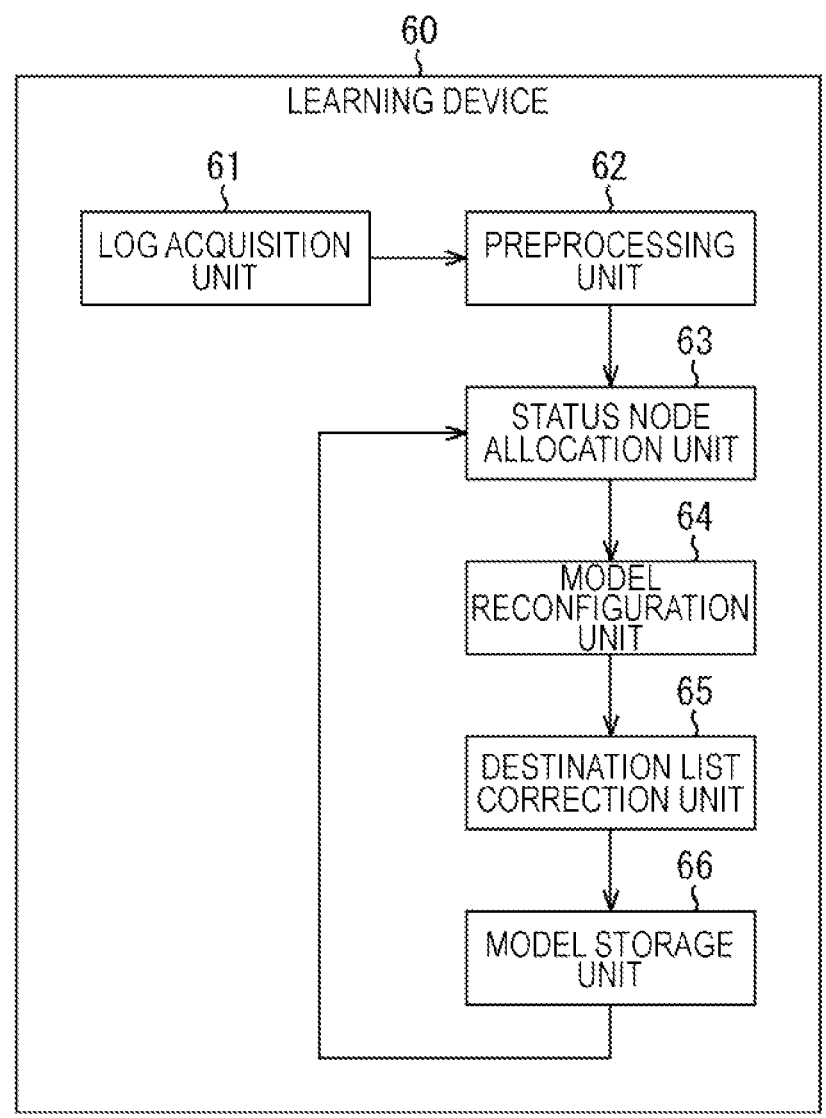
FIG. 22 is a block diagram illustrating an example structure of a learning device.

FIG. 22 illustrates an example structure of a learning device 60 which calculates a parameter of a stochastic transition model stored in the stochastic transition model DB 13B.

The learning device 60 has a log acquisition unit 61, a pre-processing unit 62, a status node allocation unit 63, a model reconfiguration unit 64, a destination list correction unit 65 and a model storage unit 66.

The log acquisition unit 61 acquires the past movement history as learning data, and supplies the past movement history to the pre-processing unit 62.

The pre-processing unit 62 performs interpolation by performing an interpolation operation such as linear interpolation on a lack portion of temporary data of learning data, and supplies the past movement history subjected to the operation to the status node allocation unit 63.

The status node allocation unit 63 allocates a status node of the stochastic transition model to the past movement history supplied from the pre-processing unit 62. More specifically, the status node allocation unit 63 calculates the goodness of fit of each position data of the past movement history which is learning data and the existing stochastic transition model, and determines whether or not the goodness of fit is a predetermined threshold or more. Further, when the goodness of fit is the predetermined threshold or more, the status node allocation unit 63 allocates the existing status node to this position data. Meanwhile, when the goodness of fit is less than the predetermined threshold, the status node allocation unit 63 allocates a new status node to this position data. Further, sequence data (corresponding node sequence) of a node number of a status node allocated in association with the past movement history is supplied to the model reconfiguration unit 64.

The model reconfiguration unit 64 performs a model reconfiguration operation of reconfiguring a stochastic transition model based on a corresponding node sequence from the status node allocation unit 63. That is, the model reconfiguration unit 64 corrects a parameter of a status node of a current stochastic transition model and adds a parameter of a new status node.

The destination list correction unit 65 corrects the destination list stored in the model storage unit 66 when a new destination is added to the past movement history.

The model storage unit 66 stores a parameter of the stochastic transition model as a learning model. Further, the model storage unit 66 stores a destination list, too.

Figure 23:
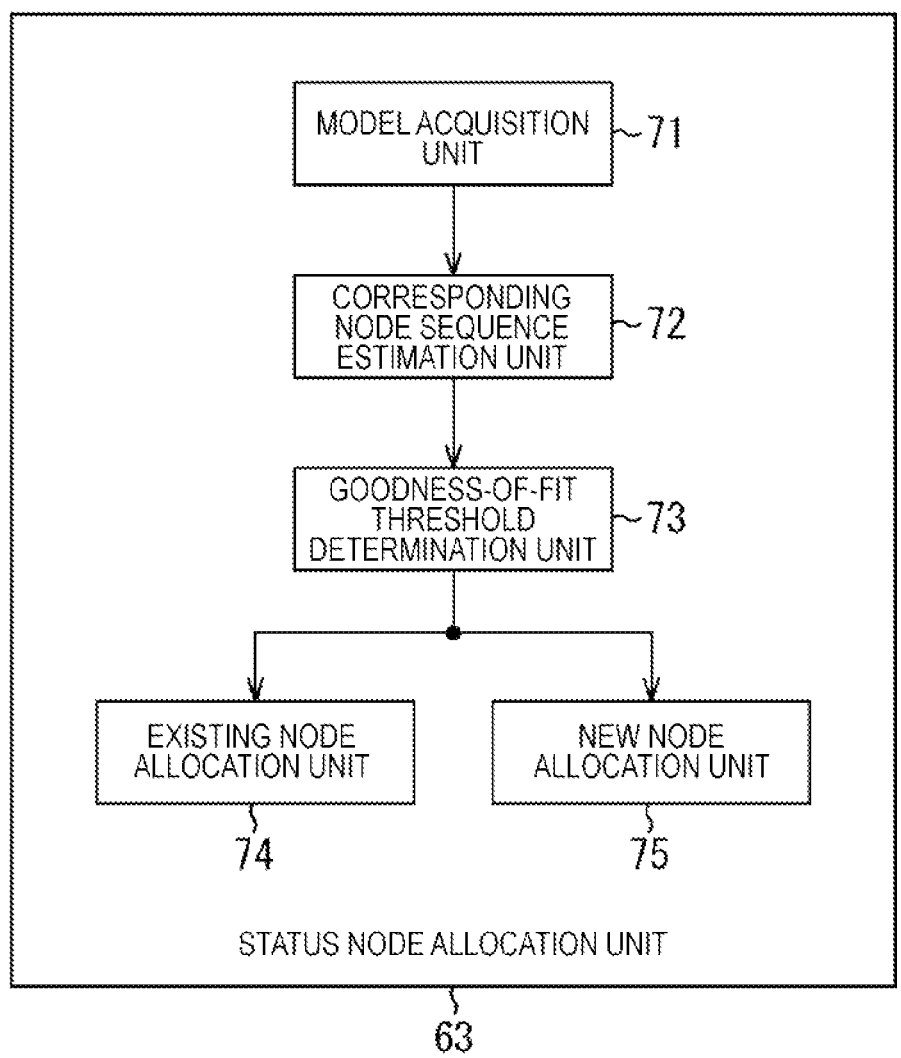
FIG. 23 is a block diagram illustrating a detailed example structure of a status node allocation unit in FIG. 22.

FIG. 23 illustrates a detailed example structure of the status node allocation unit 63 in FIG. 22.

The status node allocation unit 63 is formed with a model acquisition unit 71, a corresponding node sequence estimation unit 72, a goodness-of-fit threshold determination unit 73, an existing node allocation unit 74 and a new node allocation unit 75.

The model acquisition unit 71 acquires the parameter of the stochastic transition model from the model storage unit 66, and supplies the parameter to the corresponding node sequence estimation unit 72.

The corresponding node sequence estimation unit 72 generates (estimates) for the past movement history which is learning data a corresponding node sequence which is a corresponding status node using the existing stochastic transition model.

The goodness-of-fit threshold determination unit 73 determines whether or not the goodness of fit is a predetermined threshold or more for a status node forming the corresponding node sequence estimated by the corresponding node sequence estimation unit 72. In other words, the goodness-of-fit threshold determination unit 73 determines whether the past movement history supplied as learning data is a known route or an unknown route. Further, the goodness-of-fit threshold determination unit 73 supplies the learning data (the past movement history) which has the goodness of fit determined to have a predetermined threshold or more (known route), to the existing node allocation unit 74, and supplies learning data which has the goodness of fit determined to be less than a predetermined threshold (unknown route) to the new node allocation unit 75.

The existing node allocation unit 74 performs an existing node allocation operation of allocating a status node of an existing stochastic transition model, on the learning data of the known route supplied from the goodness-of-fit threshold determination unit 73.

The new node allocation unit 75 performs a new node allocation operation of allocating the status node of a new stochastic transition model, on learning data of an unknown route supplied from the goodness-of-fit threshold determination unit 73.

A node sequence of a status allocated by the existing node allocation operation and the new node allocation operation is supplied to the model reconfiguration unit 64 in FIG. 22.

Flowchart of Learning Operation

Figure 24:
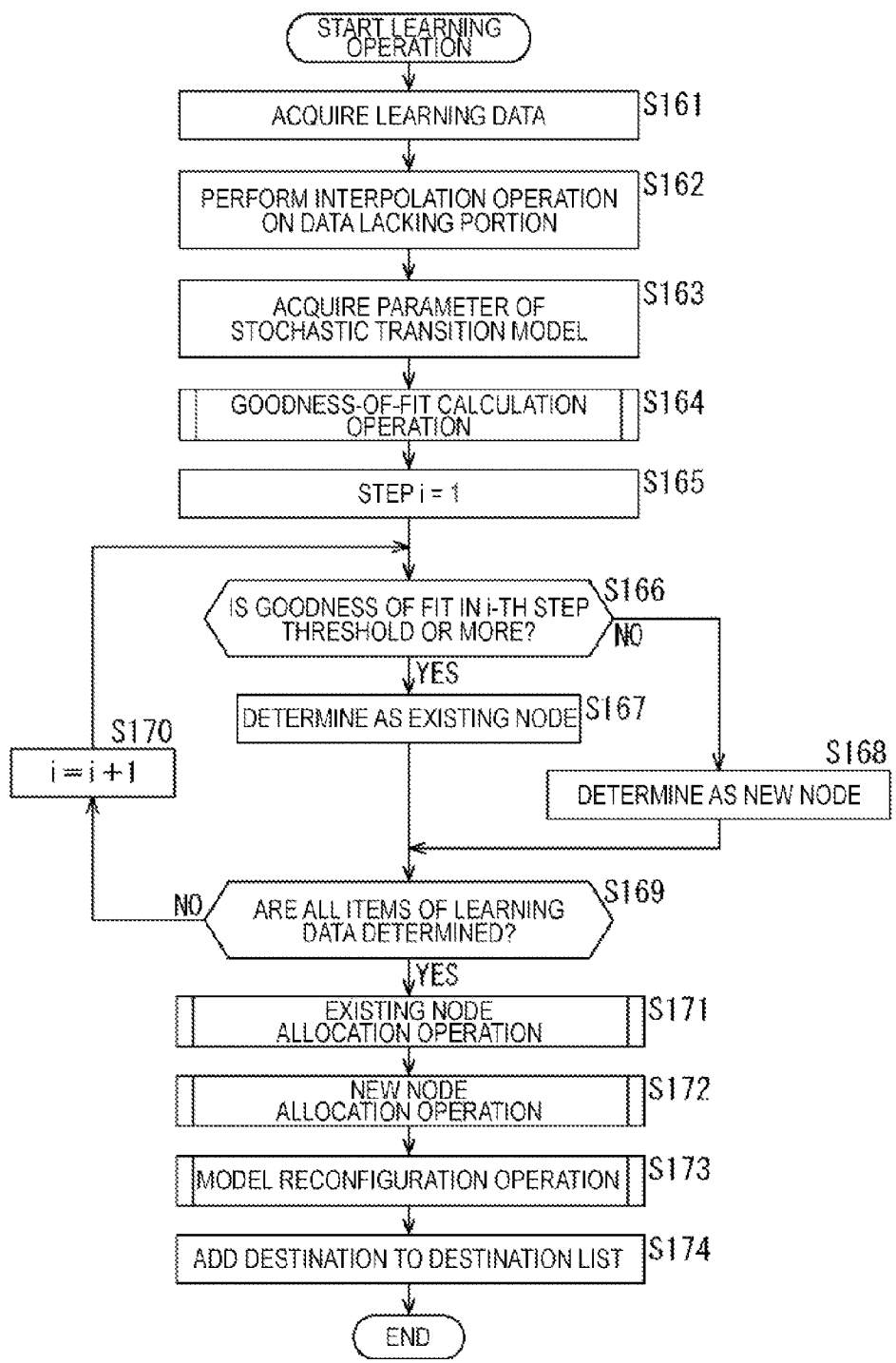
FIG. 24 is a flowchart for explaining a learning operation.

FIG. 24 illustrates a flowchart of a learning operation of the learning device 60.

First, in step S161, the log acquisition unit 61 acquires the past movement history as learning data, and supplies the past movement history to the pre-processing unit 62.

In step S162, the pre-processing unit 62 performs interpolation by performing an interpolation operation such as linear interpolation on a lack portion of temporary data of learning data, and supplies the past movement history subjected to the operation to the status node allocation unit 63.

In step S163, the model acquisition unit 71 of the status node allocation unit 63 acquires the parameter of the stochastic transition model from the model storage unit 66, and supplies the parameter to the corresponding node sequence estimation unit 72.

In step S164, the corresponding node sequence estimation unit 72 of the status node allocation unit 63 performs a goodness-of-fit calculation operation of calculating goodness of fit of each position data of the past movement history as learning data and an existing stochastic transition model.

In step S165, the goodness-of-fit threshold determination unit 73 of the status node allocation unit 63 sets 1 to a step number i of identifying each position data which configures learning data, moves the operation to step S166 and determines the goodness of fit in the i-th step is a predetermined threshold or more.

When it is determined in step S166 that the goodness of fit in the i-th step is a predetermined threshold or more, the operation moves to step S167, and the goodness-of-fit threshold determination unit 73 determines that position data of the step number i of the learning data corresponds to the existing node.

Meanwhile, when it is determined in step S166 that the goodness of fit in the i-th step is less than a predetermined threshold, the operation moves to step S168, and the goodness-of-fit threshold determination unit 73 determines that position data of the step number i of learning data corresponds to a new node.

In step S169, the goodness-of-fit threshold determination unit 73 determines whether or not a node is an existing node or a new node for all items of learning data.

When it is determined in step S169 that determination is not made for all items of learning data, the operation moves to step S170, the goodness-of-fit threshold determination unit 73 increments a step number by 1 and the operation returns to step S166.

Meanwhile, when it determined in step S169 that determination is made for all items of learning data, the operation moves to step S171, and the existing node allocation unit 74 of the status node allocation unit 63 performs an existing node allocation operation of allocating the status node of the existing stochastic transition model to learning data of a known route.

Next, in step S172, the new node allocation unit 75 of the status node allocation unit 63 performs a new node allocation operation of allocating a status node of a new stochastic transition model to learning data of an unknown route.

The operations in steps S171 and S172 can be executed in parallel.

Further, in step S173, the model reconfiguration unit 64 performs a model reconfiguration operation of reconfiguring a stochastic transition model based on a corresponding node sequence from the status node allocation unit 63.

In step S174, when a new destination is added to the past movement history, the destination list correction unit 65 adds the added destination to the destination list stored in the model storage unit 66, and finishes the operation. In addition, when there is not a destination to add, the operation in step S174 is skipped.

Flow of Goodness-of-Fit Calculation Operation

Figure 25:
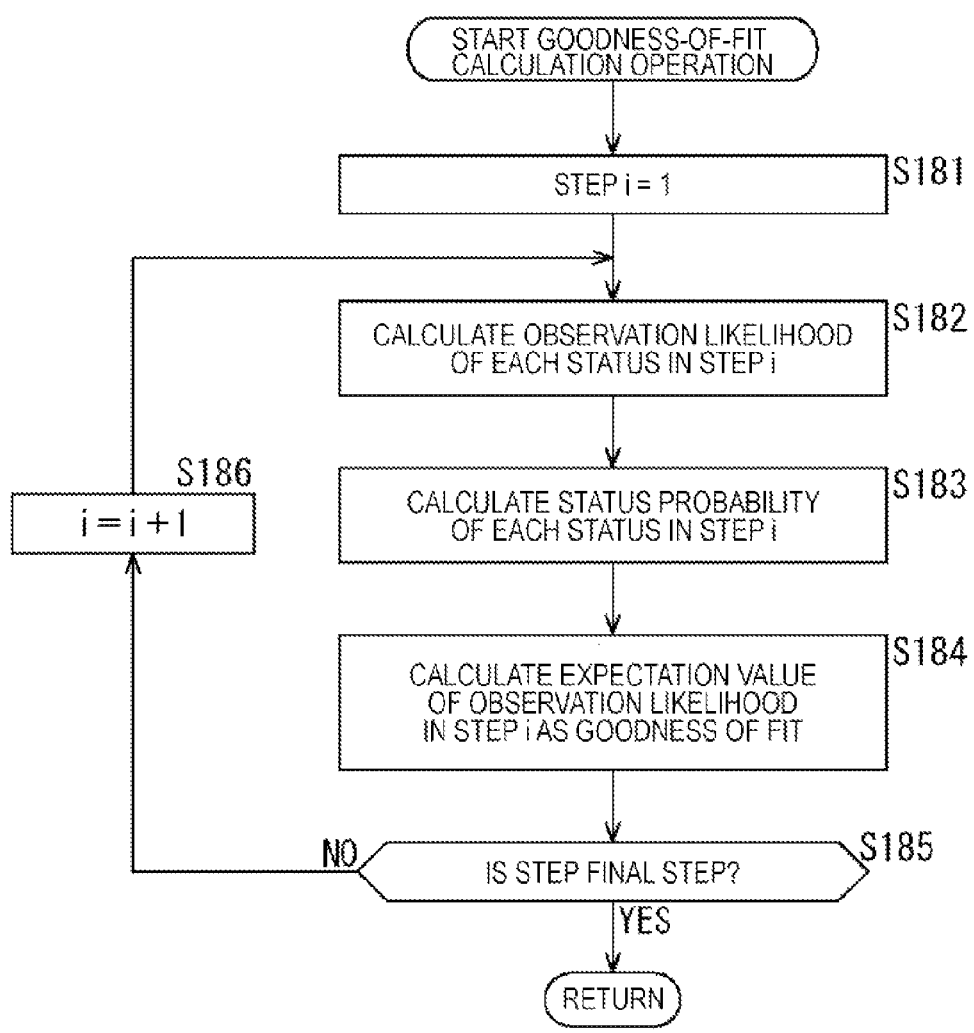
FIG. 25 is a flowchart for explaining a goodness-of-fit calculation operation.

FIG. 25 is a flowchart of a goodness-of-fit calculation operation executed in step S164 in FIG. 24.

In this operation, in step S181, the status node allocation unit 63 first sets 1 to the step number i of identifying each position data which configures learning data.

Further, in step S182, the status node allocation unit 63 calculates an observation likelihood of each status in step i according to following equation (4).

[Mathematical Formula 4]

$$P(x_t \mid \mu_i, s_i) = \prod_{d=1}^{3} \frac{1}{\sqrt{2\pi\sigma_{id}^2}} \exp\left(-\frac{(x_{td} - \mu_{id})^2}{2\sigma_{id}^2}\right) \quad (4)$$

The observation likelihood in equation (4) represents a likelihood that data $x_t$ is observed from a status node $s_i$ which has a regular distribution of the center value $\mu_i$ and the variance $\sigma_i^2$. In addition, $\Pi\{x_d\}$ means multiplying $x_d$ when d=1, 2, 3 is true, and d=1, 2, 3 represents the time, the latitude and the longitude of the past movement route.

In step S183, the status node allocation unit 63 calculates the status probability of each status in step i according to following equation (5).

$$\delta_i(1) = P(x_1 \mid \mu_i, s_i)/Z_1$$

$$\delta_j(t) = \max[a_{ij}\delta_i(t-1)] \cdot P(x_t \mid \mu_j, s_j)/Z_t \quad \text{[Mathematical Formula 5]}$$

In equation (5), $\delta_i(1)$ represents the probability which is the status $s_i$ in a head step. Further, $\delta_i(t)$ represents a probability which is the status $s_j$ in step t. $\max[a_{ij}\delta_i(t-1)]$ in equation (5) means selecting a maximum product of a status probability in step t−1 and a transition probability from this place among status transitions reaching the status $s_j$. In addition, $Z_t$ in equation (5) is a normalization parameter, and is a sum of $\delta_i(t)$ of all statuses $s_i$.

According to equation (5), it is possible to estimate a status history which reflects a topology configured by transition between status nodes.

In step S184, the status node allocation unit 63 calculates an expectation value of an observation likelihood in step i as goodness of fit according to following equation (6).

[Mathematical Formula 6]

$$L(t) = \sum_{j=1}^{N} P(x_t | \mu_j, s_j) \cdot \delta_j(t) \quad (6)$$

In equation (6), an expectation value is calculated using the status probability $\delta_j(t)$ for a likelihood $P(x_t|\mu_j,s_j)$ of the status $s_j$ at a time t.

In step S185, the status node allocation unit 63 determines whether or not step i is the final step.

When it is determined in step S185 that step i is not the final step, the operation moves to step S186, the status node allocation unit 63 increments the step number by 1 and the operation returns to step S182.

Meanwhile, when it is determined in step S185 that step i is the final step, the operation returns to FIG. 24.

Flow of Existing Node Allocation Operation

Next, the existing node allocation operation executed in step S171 in FIG. 24 will be described with reference to the flowchart in FIG. 26.

Figure 26:
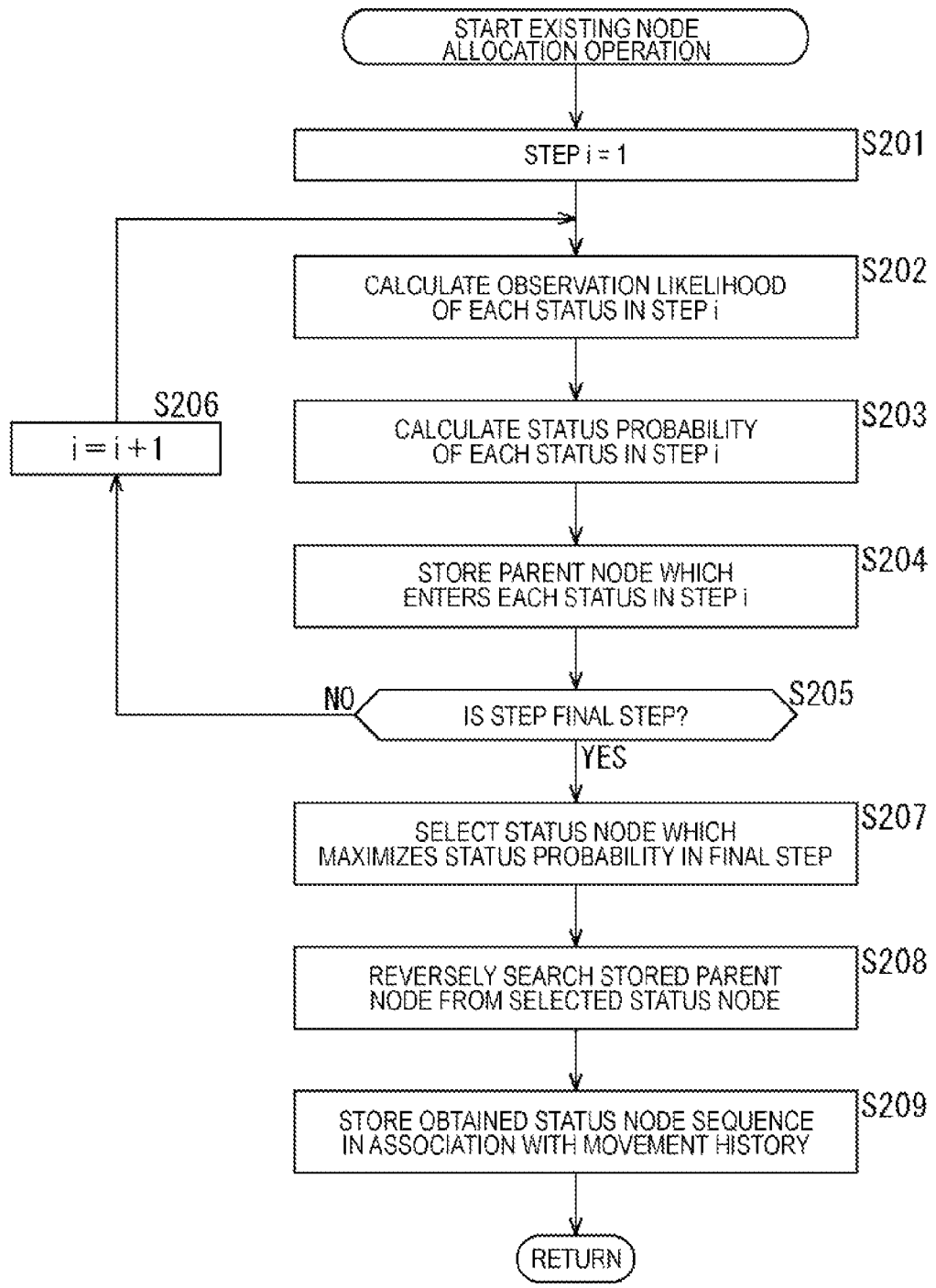
FIG. 26 is a flowchart for explaining an existing node allocation operation.

Steps S201 to S203 in FIG. 26 are the same as steps S181 to S183 in FIG. 25, and therefore will not be described. Meanwhile, step numbers in the existing node allocation operation are step numbers with respect to learning data determined as an existing node.

In step S204, the status node allocation unit 63 stores a parent node which reaches each status in step i. More specifically, the status node allocation unit 63 calculates and stores a status node number calculated in following equation (7).

$$\Psi_j(t)=\mathrm{argmax}_i[a_{ij}\delta_i(t-1)] \quad \text{[Mathematical Formula 7]}$$

$\Psi_j(t)$ in equation (7) is a node number of a status node which has a maximum product of the status probability in step $t-1$ and a transition probability from a place. $\mathrm{argmax}_i[x]$ represents an index i which maximizes x which can be obtained by changing the index i to an integer in a range of 1 to N.

In step S205, the status node allocation unit 63 determines whether or not step i is the final step.

When it is determined in step S205 that step i is not the final step, the operation moves to step S206, the status node allocation unit 63 increments the step number i by 1 and the operation returns to step S202.

Meanwhile, when it is determined in step S205 that step i is the final step, the operation moves to step S207, and the status node allocation unit 63 selects a status node which maximizes the status probability in the final step.

More specifically, the operation in step S207 is the operation of setting $S(T)=\mathrm{argmax}_i[\delta_i(T)]$ when the final step is, for example, t=T, and is an operation of associating a status node of the finally highest status probability with the final step of the learning data of the known route.

In step S208, the status node allocation unit 63 reversely searches for the parent node stored in step S204 from the status nodes selected in step S207.

The operation in step S208 is the operation of setting $S(t-1)=\Psi(S(t))$. By this means, it is possible to sequentially find the status node S(t) associated with the t-th step of the movement history, and finally obtain a status node sequence corresponding to the known movement history.

In step S209, the status node allocation unit 63 stores the status node sequence obtained in step S208 inside in association with the known movement history as learning data, and returns to FIG. 24.

Flow of New Node Allocation Operation

Next, the new node allocation operation executed in step S172 in FIG. 24 will be described with reference to the flowchart in FIG. 27.

First, in step S221, the status node allocation unit 63 learns an unknown movement history as learning data according to an HMM (stochastic transition model). In step S221, a new status node is allocated per step of an unknown movement history, and a parameter of the HMM associated with the unknown movement history is calculated.

In step S222, the status node allocation unit 63 allocates a new node number as a status node to be added to the existing HMM (stochastic transition model), to the status node obtained by learning.

In step S223, the status node allocation unit 63 stores an unknown movement history which is learning data and a status node sequence of a corresponding new node number inside, and returns to FIG. 24.

Flow of Model Reconfiguration Operation

Figure 28:
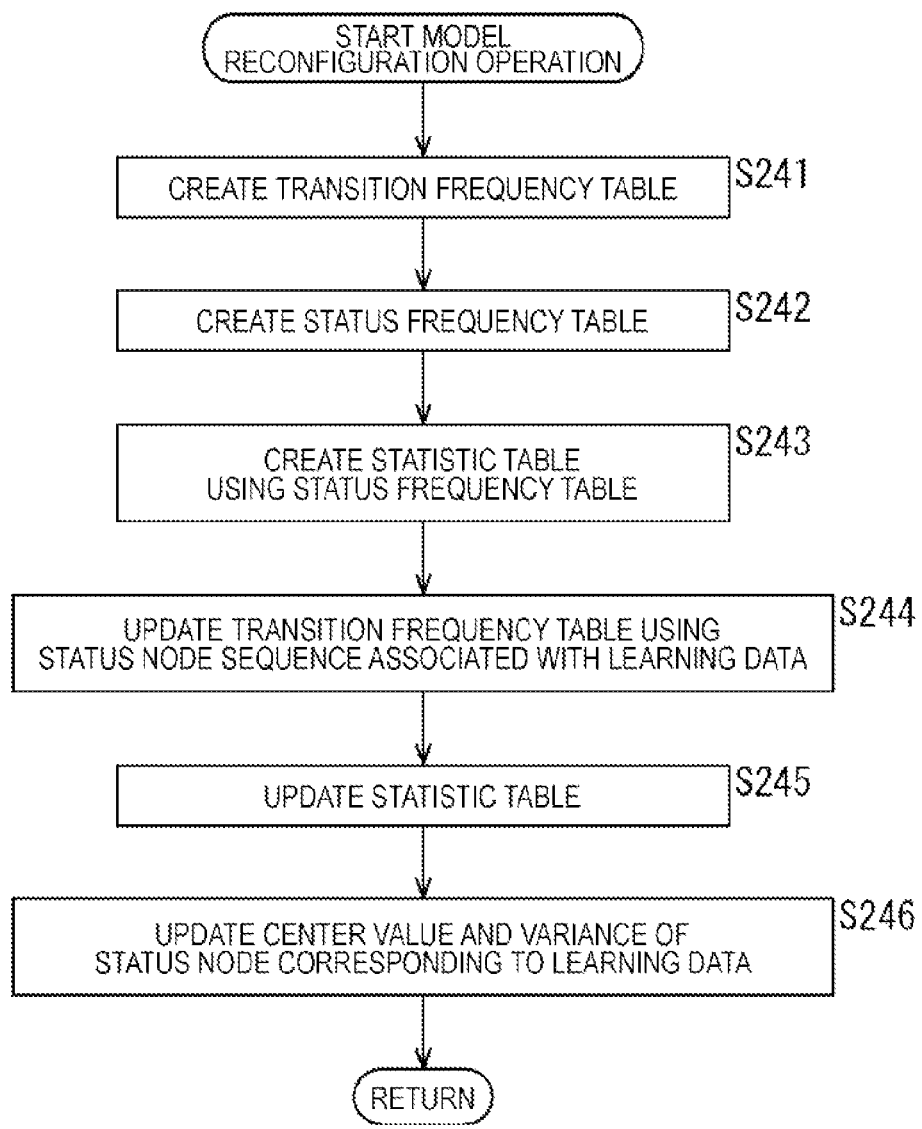
FIG. 28 is a flowchart for explaining a model reconfiguration operation.

Next, the model reconfiguration operation executed in step S173 in FIG. 24 will be described with reference to the flowchart in FIG. 28.

First, in step S241, the model reconfiguration unit 64 creates a transition frequency table.

FIG. 29 illustrates an example of a transition frequency table created in step S241. In the transition frequency table, the status transition probability $a_{ij}$ of the HMM in FIG. 18 is the transition frequency.

In step S242, the model reconfiguration unit 64 generates a status frequency table from the transition frequency of the transition frequency table according to following equation (8).

[Mathematical Formula 8]

$$f_i = \sum_{j=1}^{N} f_{ij} \quad (8)$$

Equation (8) represents that a status frequency $f_i$ of the status $s_i$ can be obtained by the total sum of a transition frequency $f_{ij}$ of the status $s_j$.

In step S243, the model reconfiguration unit 64 generates a statistic table which includes the center value $M_i$ and the variance $\Sigma_i^2$ of the status frequency according to following equation (9) using the status frequency table.

$$M_i=\mu_i \cdot f_i, \Sigma_i^2=(\sigma_i^2+\mu_i)\cdot f_i \quad (9)$$

Figure 27:
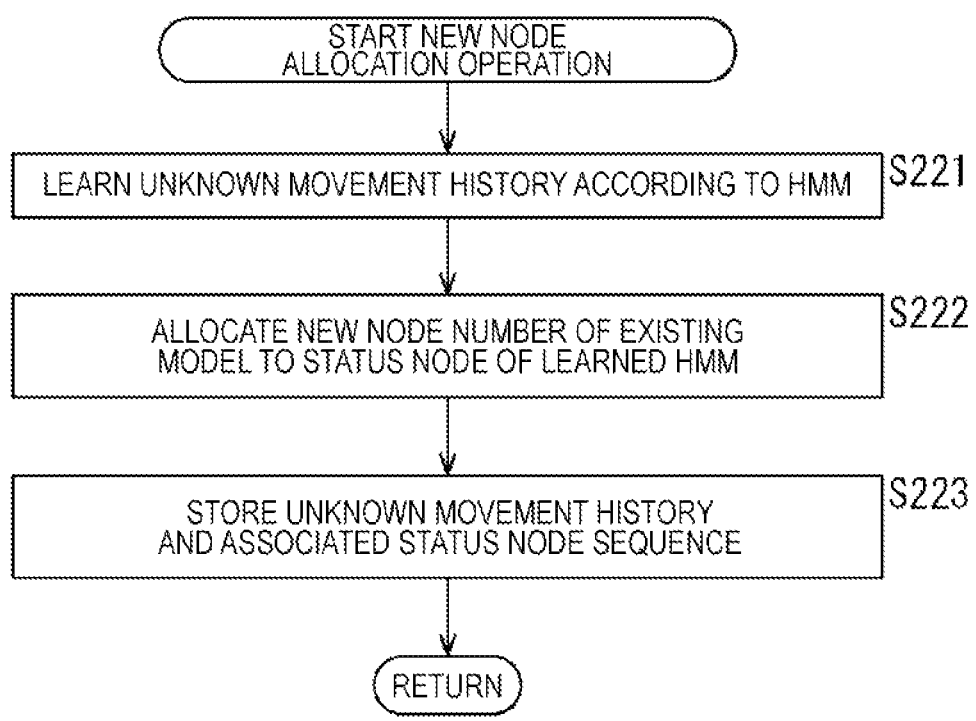
FIG. 27 is a flowchart for explaining a new node allocation operation.

In step S244, the model reconfiguration unit 64 updates a transition frequency table using the status node sequence corresponding to learning data generated and stored by the existing node allocation operation in FIG. 26 and the new node allocation operation in FIG. 27. Meanwhile, the updated transition frequency $f_{ij}$ is represented as a transition frequency $f_{ij}'$, and the updated status frequency table is represented as $f_i'$.

In step S245, the model reconfiguration unit 64 updates the statistic table according to equation (9) by adding position data corresponding to a status node produced by the existing node allocation operation in FIG. 26 and the new node allocation operation in FIG. 27 and a square value of the position data to the center value $M_i$ and the variance $\Sigma_i^2$ of the status frequency. The center value $M_i$ and the variance $\Sigma_i^2$ of the status frequency of the updated statistic table are represented as $M_i'$ and $\Sigma_i^{2'}$.

In step S246, the model reconfiguration unit 64 updates the center value $\mu_i$ and the variance $\sigma_i^2$ of the status node produced by the existing node allocation operation in FIG. 26 and the new node allocation operation in FIG. 27 according to following equation (10), and returns to FIG. 24.

$$\mu_i' = M_i'/f_i', \sigma_i^{2'} = \Sigma_i^{2'}/f_i' - \mu_i^2) \quad (10)$$

As described above, according to the learning operation described with reference to FIGS. 24 to 28, the existing learning model can be corrected (updated) and extended based on the newly inputted movement history. In addition, the first learning operation the existing model of which does not exist is an operation of learning the stochastic transition model based on determination that the inputted movement history is all unknown routes, and can be supported by the above operation.

Flowchart of Prediction Operation

The prediction operation according to the second embodiment will be described with reference to a flowchart of FIG. 30.

First, in step S301, the similar node search unit 14B acquires (a parameter of) the stochastic transition model and the destination list obtained by advanced learning, from the stochastic transition model DB 13B.

In step S302, the similar node search unit 14B acquires the immediate movement history from the buffer 12.

In step S303, the similar node search unit 14B searches for and selects the status node corresponding to the immediate movement history. More specifically, the similar node search unit 14B performs a goodness-of-fit calculation operation (step S164 in FIG. 24 and FIG. 25) described as to the above learning operation, performs the existing node allocation operation (step S171 in FIG. 24 and FIG. 26) and searches for and selects a status node corresponding to the immediate movement history.

In step S304, the fitness determination unit 15B determines whether or not the goodness of fit of the status node selected by the similar node search unit 14B is a predetermined threshold or more.

When it is determined in step S304 that goodness of fit of the selected status node is less than the predetermined value, the prediction operation is finished.

Meanwhile, when it is determined in step S304 that the goodness of fit of the selected status node is the predetermined threshold or more, the operation moves to step S305. In step S305, the prediction node search unit 16B searches for a destination by performing tree search on a destination node to which a transition can be made from the selected status node.

In step S306, the prediction node search unit 16B lists up the searched destination per destination.

In step S307, the prediction value calculation unit 18B calculates a route list and a typical route to the destination per listed up destination.

A typical route $r_i$ to the destination i can be calculated according to, for example, following equation (11).

[Mathematical Formula 9]

$$r = \operatorname{argmin}_j \left( \prod_{k=1}^{T_j-1} a(s_k^j, s_{k+1}^j) \right) \quad (11)$$

$$r_i = \{s_k \mid k = 1, \ldots, T_r\}$$

In equation (11), $T_j$ represents the length (the number of steps) of the j-th route list and a $(s_k, s_{k+1})$ represents a transition probability from the status node $s_k$ to a status node $s_{k+1}$. Hence, $s_k^j$ represents a k-th status node of a j-th route list, $s_1^j$ represents a current place node and $s_{T_j}^j$ represents a destination node of the j-th route list.

Hence, equation (11) means that, as to the destination i, a r-th route $r_i$ of the highest occurrence probability is a typical route and the typical route $r_i$ includes a status node sequence of $\{s_1, s_2, s_3, \ldots, s_{T_r}\}$. The method of selecting a typical route may be methods other than this method.

In step S308, the prediction value calculation unit 18B calculates a reach probability to each destination.

A reach probability $p_i$ to the destination i can be calculated according to, for example, following equation (12).

[Mathematical Formula 10]

$$p_i = \sum_{j=1}^{N_i} \prod_{k=1}^{T_j-1} a(s_k^j, s_{k+1}^j) \quad (12)$$

In equation (12), $N_i$ represents the number of route lists reaching the destination i from the current place node.

In step S309, a required time to each destination is calculated and outputted, and the operation is finished.

A required time $t_i$ of the typical route $r_i$ to the destination i can be calculated according to, for example, following equation (13).

[Mathematical Formula 11]

$$t_i = \frac{\sum_t t \cdot p_{s_{T-1}}(t-1) \cdot a(s_{T-1}, s_T)}{\sum_t p_{s_{T-1}}(t-1) \cdot a(s_{T-1}, s_T)} \quad (13)$$

$$p_{s_1}(1) = 1$$

$$p_{s_k}(t) = p_{s_k} \cdot (t-1) \cdot a(s_k, s_k) + p_{s_{k-1}} \cdot (t-1) \cdot a(s_{k-1}, s_k)$$

In equation (13), $s_k$ is a k-th status node of the status node sequence of the typical route r, T is the length (the number of steps) of the route list of the typical route, t=1 is a current place node and t=T is a destination node.

Further, in equation (13), $p_{s_1}(1)$ represents the status node $s_1$ in step S1. $p_{s_k}(t)$ represents a probability that the user is present at the status node $s_k$ in step t, and is a sum of a probability that the user is at the status node $s_k$ in previous step and made self transition and a probability that the user is at the status node $s_{k-1}$ in previous step and made transition.

Further, the required time $t_i$ in equation (13) is an expectation value when the user is at the status node $s_{T-1}$ which is one node before the destination node $s_T$ at a time t−1 and transitions to the destination node $s_T$ for the first time at the time t.

Flowchart of Second Sensor Control Operation Using Absolute Predicted Departure Time Next, the second sensor control operation according to the first embodiment using the absolute predicted departure time will be described with reference to a flowchart in FIG. 31.

Figure 30:
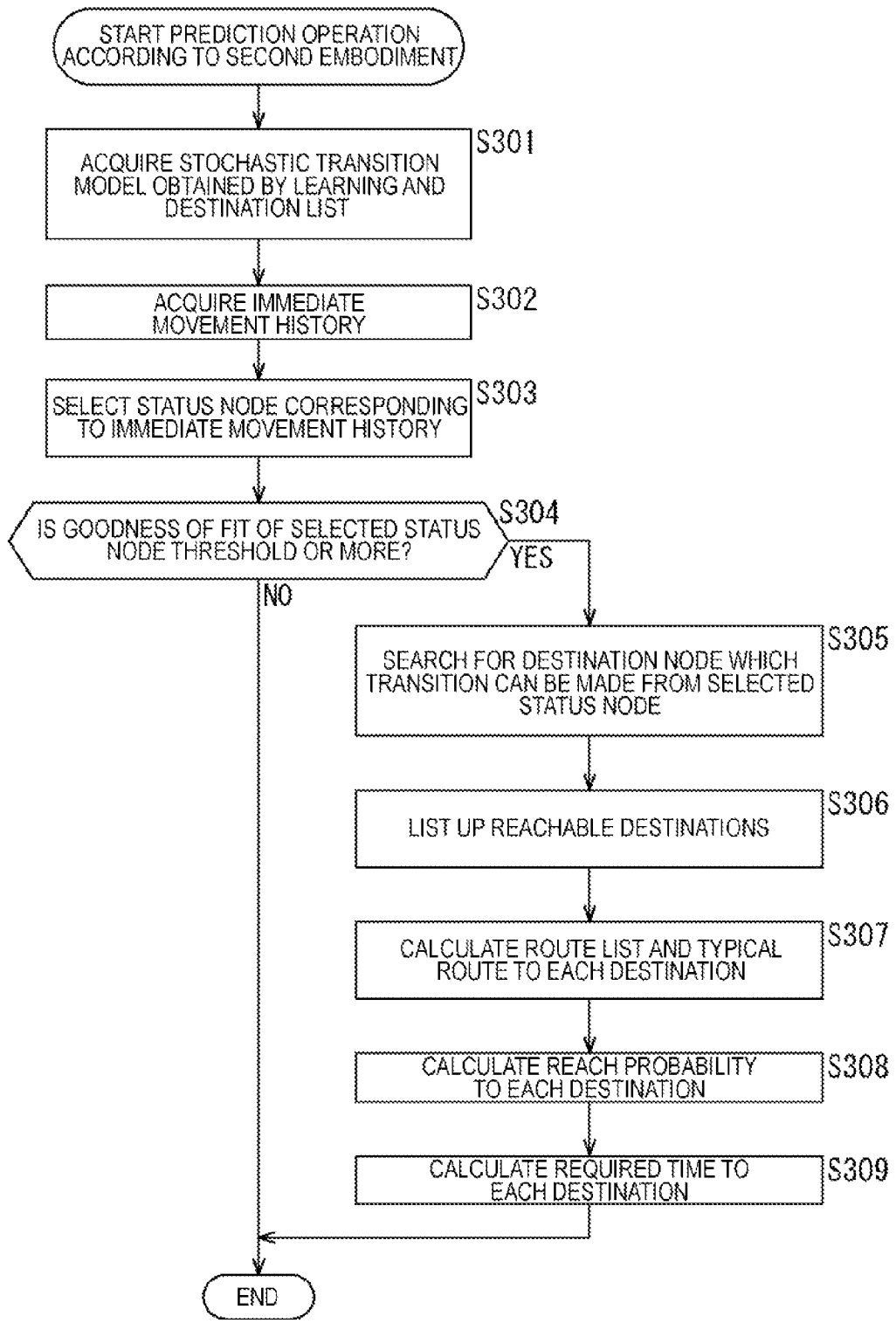
FIG. 30 illustrates a flowchart for explaining the prediction operation according to the second embodiment.
Figure 31:
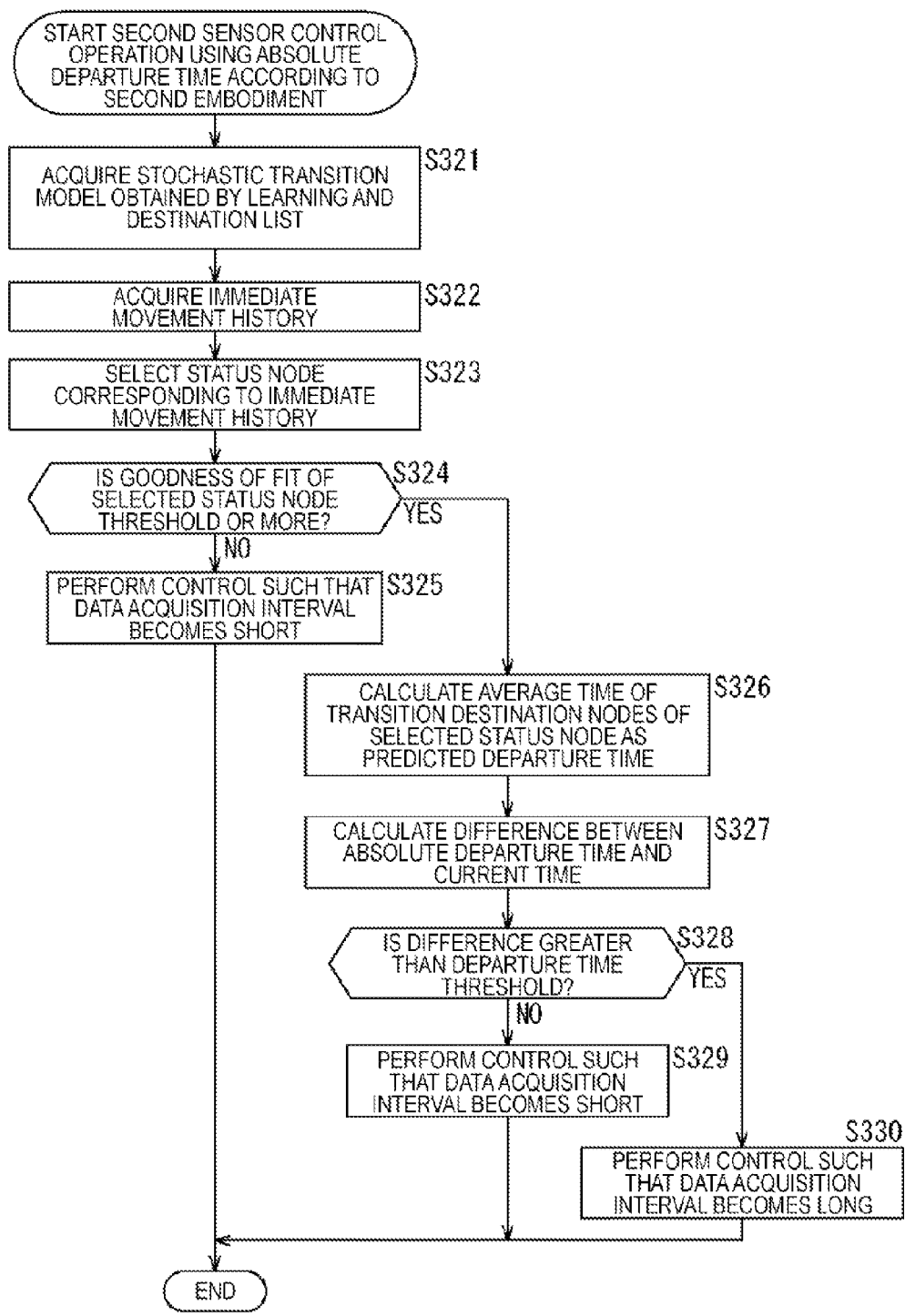
FIG. 31 is a flowchart for explaining a second sensor control operation using an absolute predicted departure time according to the second embodiment.

Steps S321 to S324 in FIG. 31 are the same as steps S301 to S304 in FIG. 30, and therefore will not be described.

When it is determined in step S324 that goodness of fit of the selected status node is less than the predetermined threshold, the operation moves to step S325, and the sensor control unit 19 controls the position sensor unit 11 such that the data acquisition interval becomes short and finishes the operation.

Meanwhile, when it is determined in step S324 that the goodness of fit of the selected status node is a predetermined threshold or more, the operation moves to step S326.

In step S326, the departure time prediction unit 17B calculates an average (average time) of center values of times of one or more transfer destination status nodes other than self transition of the selected status node as the absolute departure time. The calculated absolute departure time is supplied to the sensor control unit 19.

In step S327, the sensor control unit 19 calculates a difference between the absolute departure time supplied from the departure time prediction unit 17B and the current time.

In step S328, the sensor control unit 19 determines whether or not the calculated difference is greater than a predetermined threshold (departure time threshold).

When it is determined in step S328 that the calculated difference is the departure time threshold or less, the operation moves to step S329, and the sensor control unit 19 performs control such that the data acquisition interval becomes short and finishes the operation.

Meanwhile, when it is determined in step S328 that the calculated difference is greater than the departure time threshold, the operation moves to step S330, and the sensor control unit 19 performs control such that the data acquisition interval becomes long and finishes the operation.

The first sensor control operation according to the second embodiment is the operation from which the above skips S326 to S329 are removed.

Flowchart of Second Sensor Control Operation Using Relative Predicted Departure Time Next, the second sensor control operation according to the second embodiment using the relative predicted departure time will be described with reference to a flowchart in FIG. 32.

Figure 32:
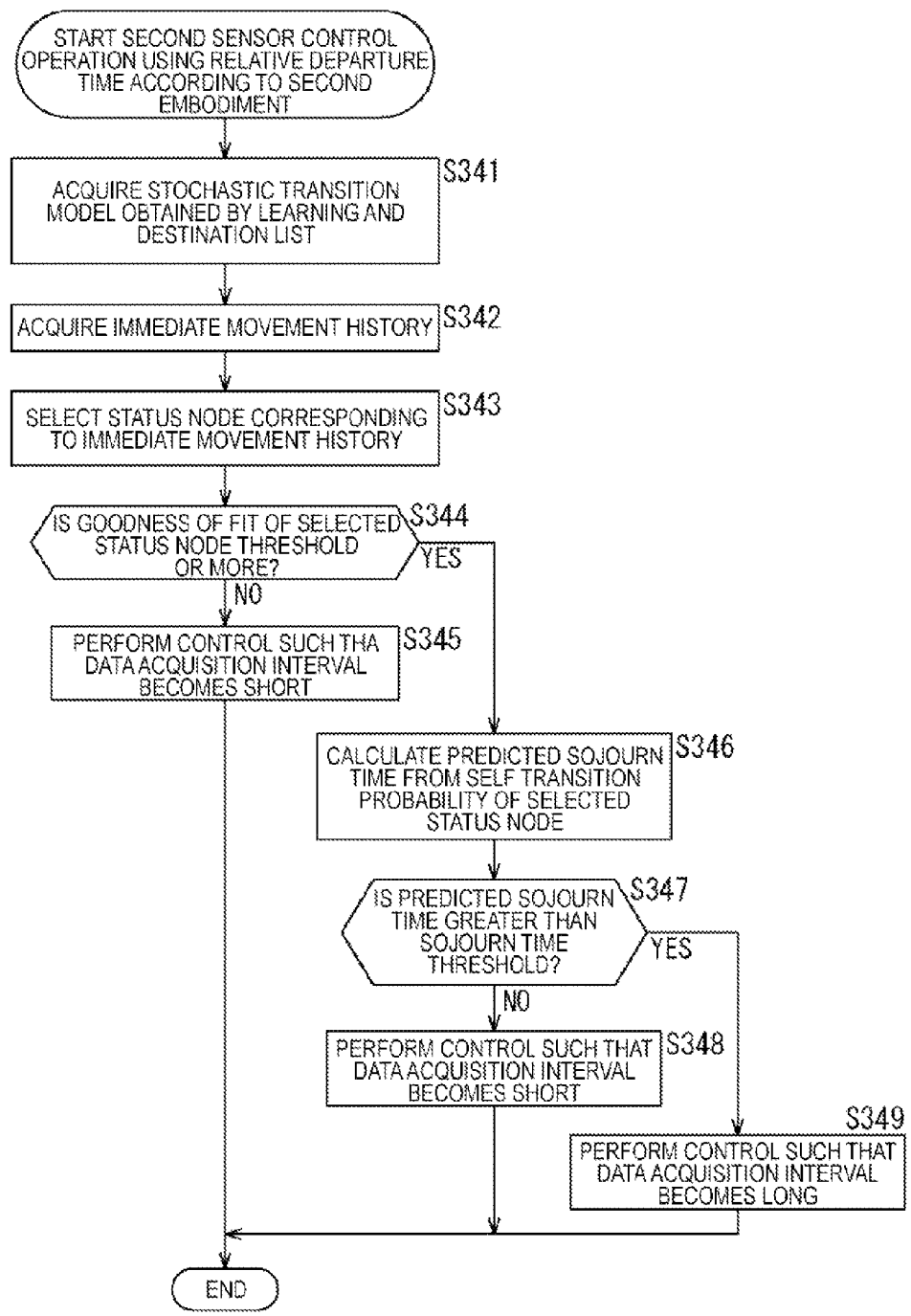
FIG. 32 is a flowchart for explaining the second sensor control operation using a relative predicted departure time according to the second embodiment.

The second sensor control operation using the relative predicted departure time in FIG. 32 differs from the second sensor control operation using the absolute predicted departure time in FIG. 31 only in steps S346 and S347 corresponding to steps S326 to S328 in FIG. 31. Hence, only the operations in steps S346 and S347 in FIG. 32 will be described, and the other operations will not be described.

In step S346, the departure time prediction unit 17B calculates the relative departure time (predicted sojourn time) from the self transition probability of the selected status node. That is, by multiplying equation (2) using the self transition probability of the selected status node with the time of a unit step, the predicted sojourn time is calculated, and is supplied to the sensor control unit 19.

In step S347, the departure time prediction unit 17B determines whether or not the calculated predicted sojourn time is greater than the predetermined threshold (sojourn time threshold).

When it is determined in step S347 that the calculated predicted sojourn time is the sojourn time threshold or less, the operation moves to step S348.

Meanwhile, when it is determined in step S347 that the calculated predicted sojourn time is greater than the sojourn time threshold value, the operation moves to step S349.

In step S348 or S349, a predetermined data acquisition interval is set to the sensor control unit 19, and the operation is finished.

Although the second sensor control operation using the absolute predicted departure time or the second sensor control operation using the relative predicted departure time is performed as described above, a final data acquisition interval may be determined based on a result obtained by combining processing results of both operations.

Flowchart of Data Correction Operation

The data correction operation according to the second embodiment will be described with reference to FIG. 33.

Figure 33:
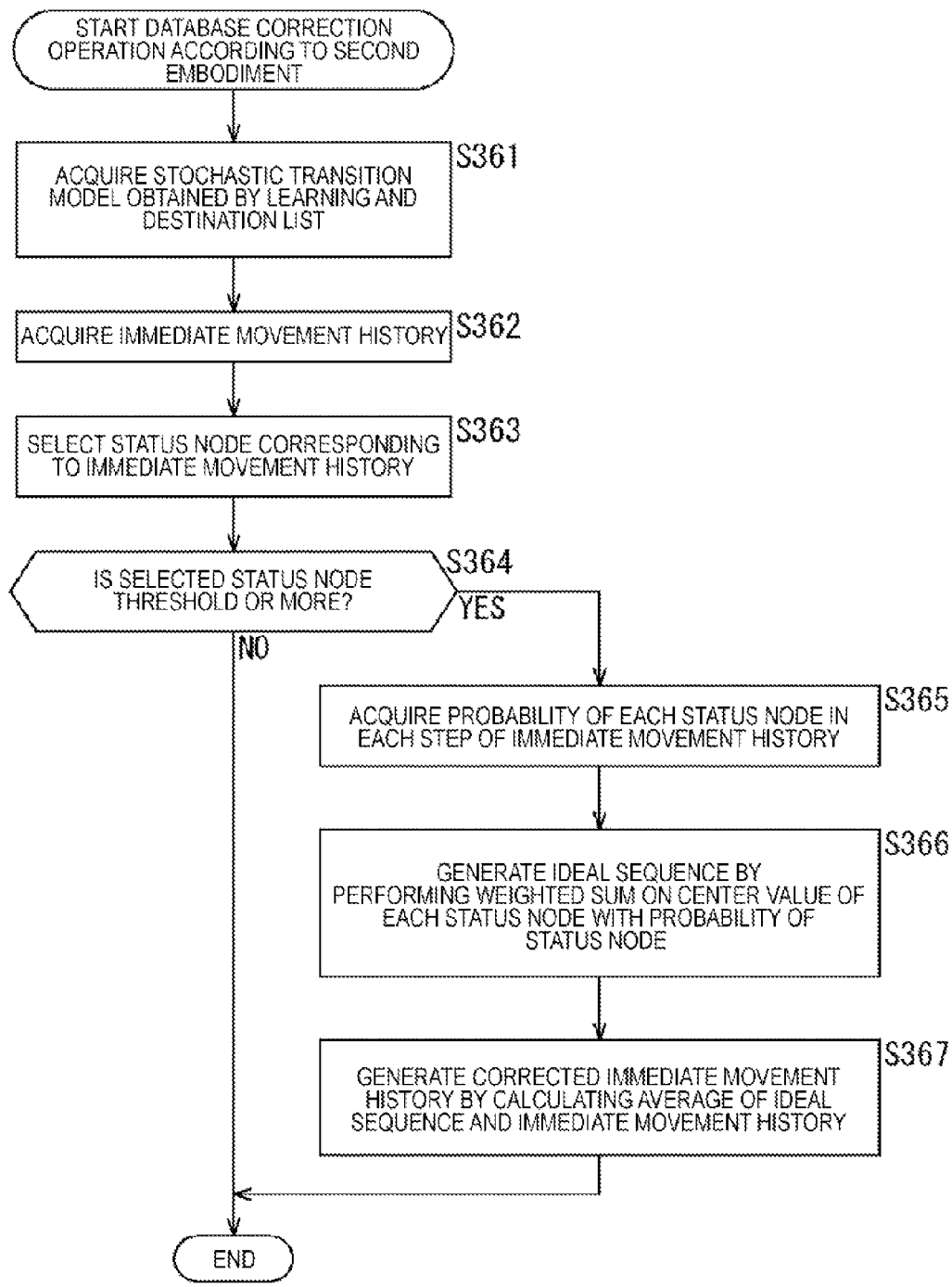
FIG. 33 is a flowchart for explaining the data correction operation according to the second embodiment.

Steps S361 to S364 in FIG. 33 are the same as steps S301 to S304 in FIG. 30, and will not be described.

In step S365, the model data correction unit 20B acquires the probability $\delta_j(t)$ of each status node corresponding to each step of the immediate movement history.

In step S366, the model data correction unit 20B generates an ideal sequence corresponding to the immediate movement history according to equation (3). That is, the model data correction unit 20B generates the ideal sequence by performing weighted addition on the center value of each status node corresponding to each step of the immediate movement history with the probability $\delta_j(t)$ of the status mode.

In step S367, the model data correction unit 20B generates the corrected immediate movement history by calculating an average of the ideal sequence and the immediate movement history, and finishes the operation.

As described above, the prediction device 1 according to the second embodiment can perform the prediction operation, the sensor control operation and the data correction operation using the stochastic transition model stored in the stochastic transition model DB 13B.

4. Third Embodiment

Example Structure of Prediction Device 1 According to Third Embodiment

An example has been described above where a prediction device 1 performs a prediction operation, a sensor control operation and a data correction operation using one of a route log and a stochastic transition model as search data of the past history DB 13.

However, the prediction device 1 may have and selectively execute both of a route log and a stochastic transition model as search data of the past history DB 13.

Figure 34:
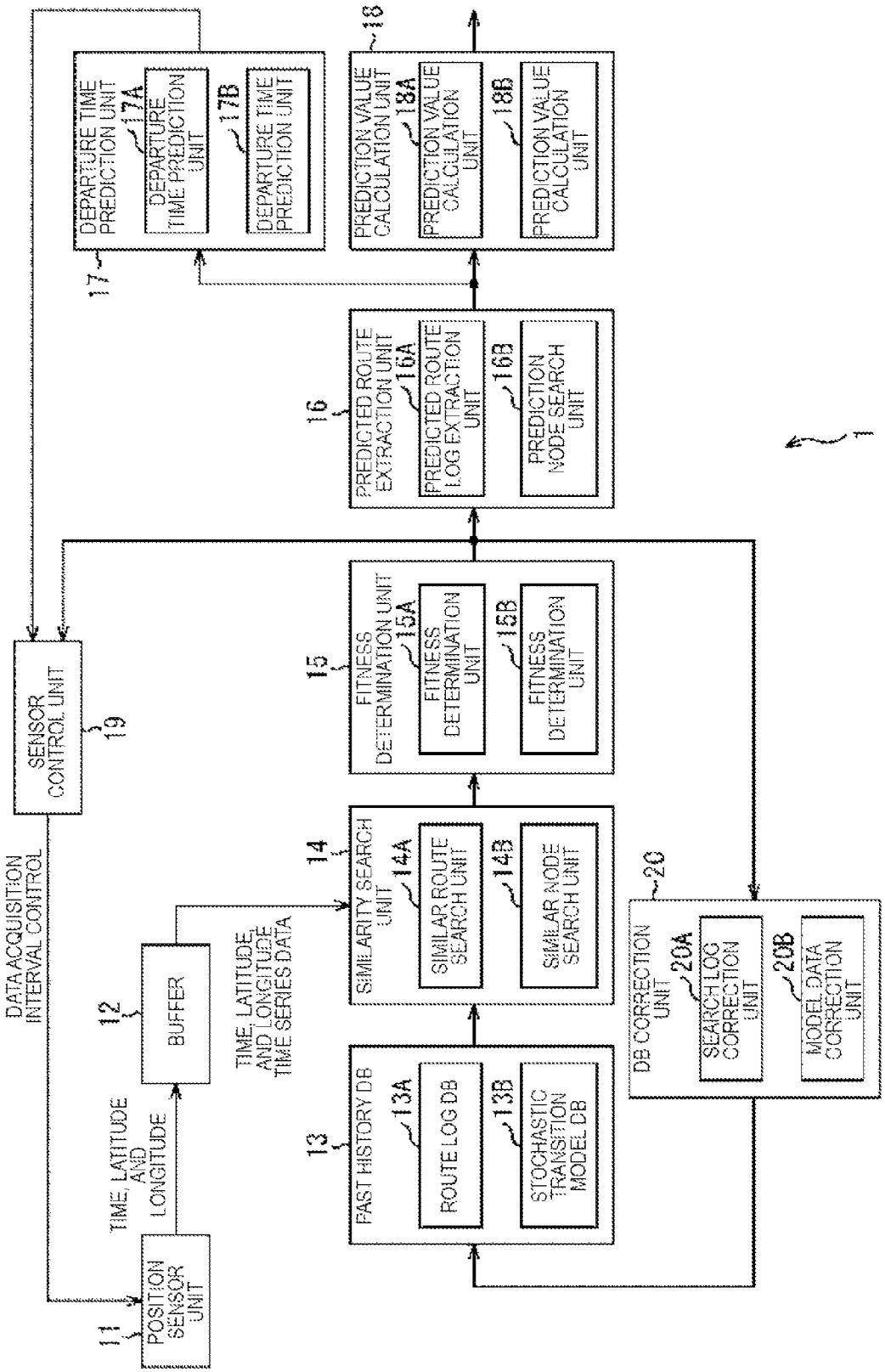
FIG. 34 is a block diagram illustrating an example structure of a third embodiment of a prediction device.

FIG. 34 is a block diagram illustrating an example structure of the prediction device 1. That is, FIG. 34 illustrates an example structure of the prediction device 1 according to the third embodiment which has and selectively executes both of the route log and the stochastic transition model.

The past history DB 13 has a route log DB 13A according to the first embodiment and a stochastic transition model DB 13B according to the second embodiment.

The similarity search unit 14 has a similar route search unit 14A according to the first embodiment and a similar node search unit 14B according to the second embodiment.

The fitness determination unit 15 has a fitness determination unit 15A according to the first embodiment, and a fitness determination unit 15B according to the second embodiment.

The predicted route extraction unit 16 has a predicted route log extraction unit 16A according to the first embodiment and a prediction node search unit 16B according to the second embodiment.

The departure time prediction unit 17 has a departure time prediction unit 17A according to the first embodiment and a departure time prediction unit 17B according to the second embodiment.

The DB correction unit 20 has a search log correction unit 20 according to the first embodiment, and a model data correction unit 20B according to the second embodiment.

In the third embodiment, a user selects which one of a route log and a stochastic transition model to use using an operation unit which is not illustrated. When use of the route log is selected, the operation described in the first embodiment is executed. Meanwhile, use of the stochastic transition model is selected, the operation described in the second embodiment is executed.

5. Fourth Embodiment

Example Structure of Prediction Device 1 According to Fourth Embodiment

In the above embodiment, a prediction device 1 has both of a sensor control function of controlling a data acquisition interval of a position sensor unit 11 and a data correction unit of correcting an immediate movement history based on search data.

However, the prediction device 1 has one of the sensor control function and the data correction function.

Figure 35:
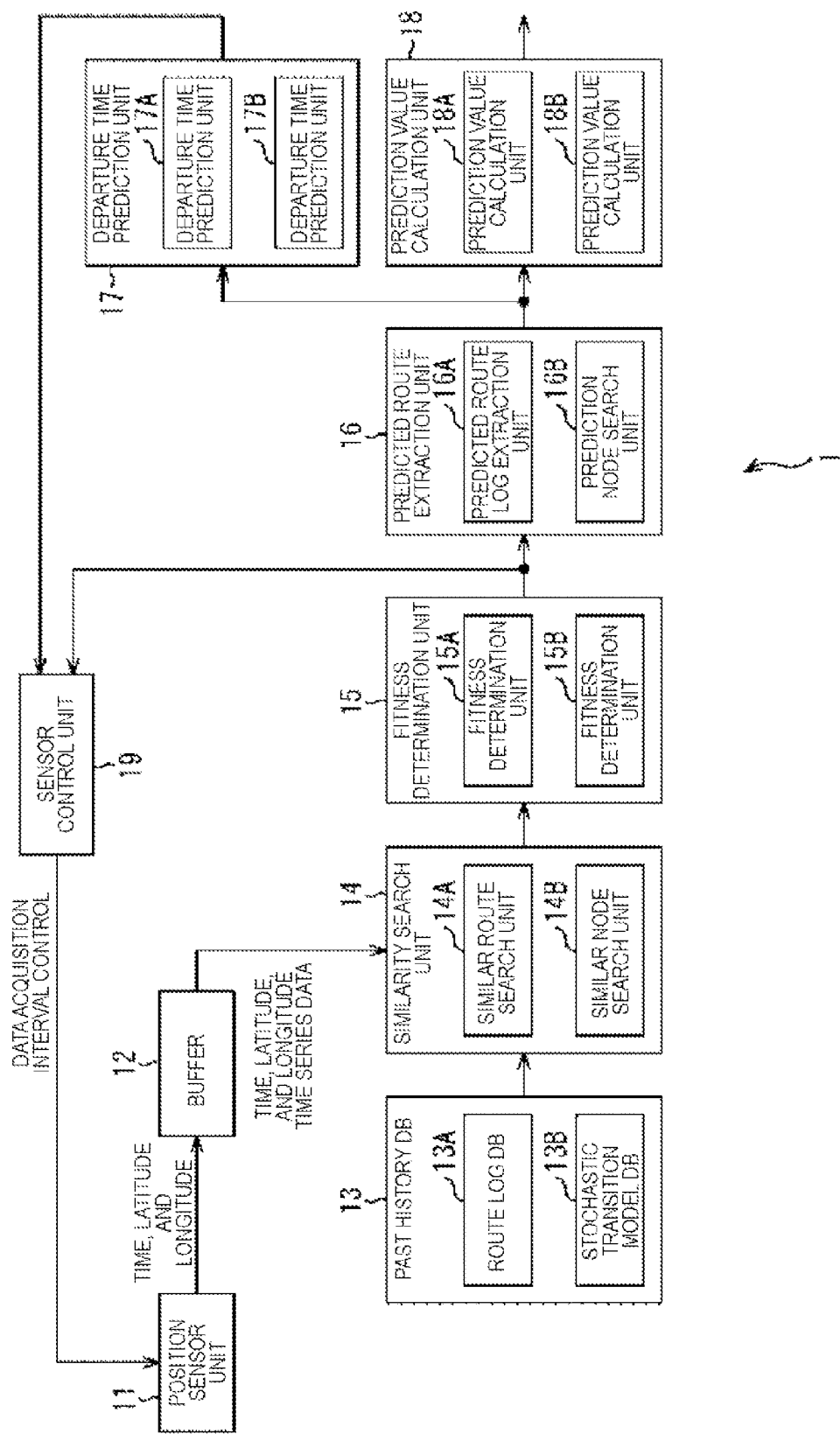
FIG. 35 is a block diagram illustrating an example structure of a fourth embodiment of a prediction device.

FIG. 35 is a block diagram illustrating an example structure of the prediction device 1 which has only a sensor control function according to the fourth embodiment of the prediction device 1.

Figure 36:
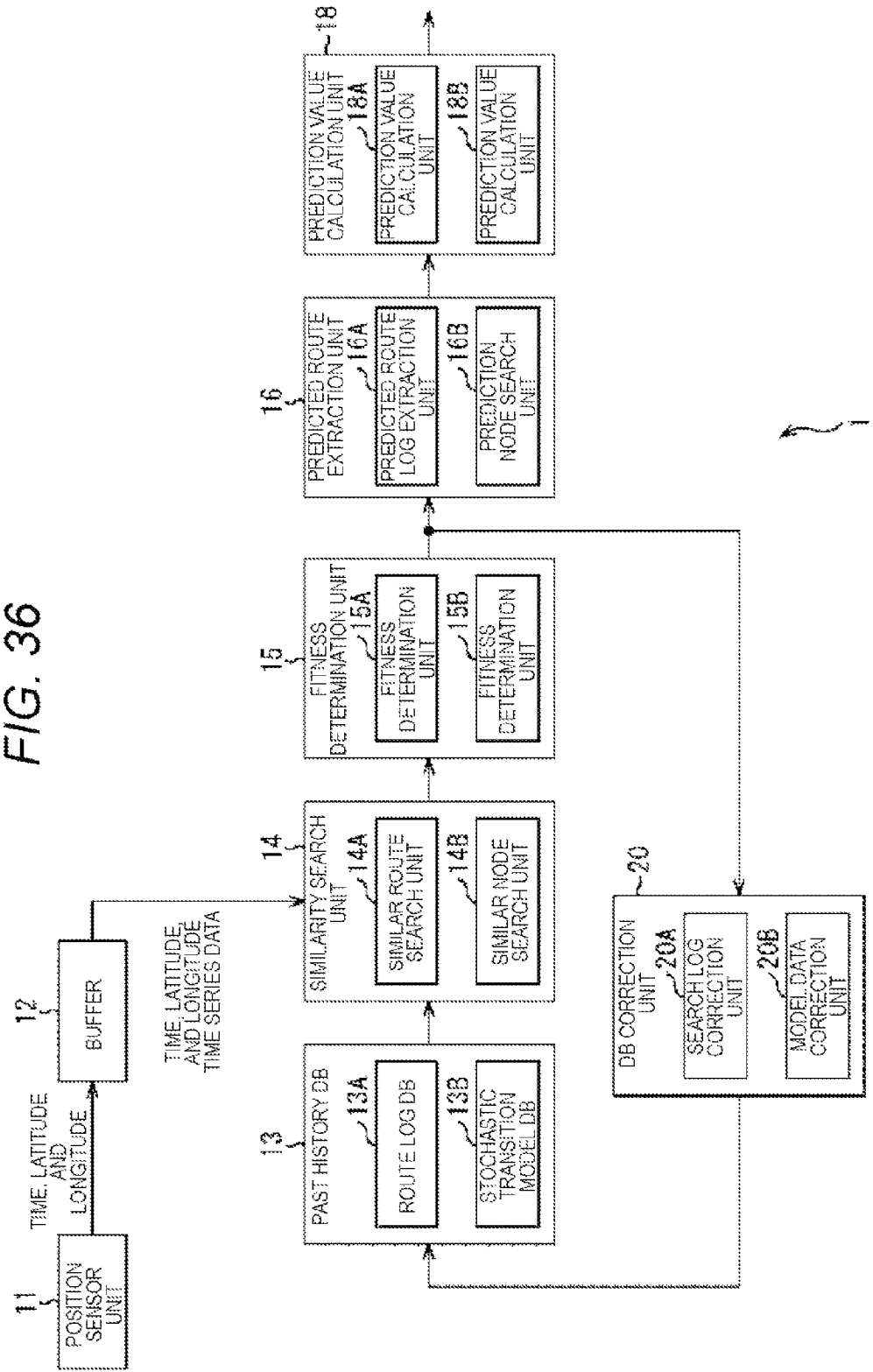
FIG. 36 is a block diagram illustrating an example structure of the fourth embodiment of the prediction device.

FIG. 36 is a block diagram illustrating an example structure of the prediction device 1 which has only a data correction function according to the fourth embodiment of the prediction device 1.

The operation of the prediction device 1 according to the fourth embodiment overlaps the above description and therefore will not be described.

Example Structure of Computer

The above described series of operations can be performed by hardware, and can also be performed by software. When the series of operations are to be performed by software, the programs configuring the software are installed in a computer. Here, the computer may be a computer incorporated into special-purpose hardware, or may be a general-purpose personal computer which can execute various kinds of functions as various kinds of programs are installed thereinto.

FIG. 37 is a block diagram illustrating an example structure of hardware of a computer which executes the above described series of operations in accordance with programs.

In the computer, a CPU (Central Processing Unit) 101, a ROM (Read Only Memory) 102, and a RAM (Random Access Memory) 103 are connected to one another by a bus 104.

An input/output interface 105 is further connected to the bus 104. An input unit 106, an output unit 107, a storage unit 108, a communication unit 109, and a drive 110 are connected to the input/output interface 105.

The input unit 106 is formed with a keyboard, a mouse, a microphone, and the like. The output unit 107 is formed with a display, a speaker, and the like. The storage unit 108 is formed with a hard disk, a nonvolatile memory, or the like. The communication unit 109 is formed with a network interface or the like. The drive 110 drives a removable recording medium 111 such as a magnetic disk, an optical disk, a magnetooptical disk, or a semiconductor memory.

In the computer having the above described configuration, the CPU 101 loads a program stored in the storage unit 108 into the RAM 103 via the input/output interface 105 and the bus 104, and executes the program, so that the above described series of operations are performed.

In the computer, the program can be installed to the storage unit 108 through the input/output interface 105 by attaching the removable recording medium 111 to the drive 110. Alternatively, the programs can be received at the communication unit 109 via a wired or wireless transmission medium such as a local area network, the Internet, or digital satellite broadcasting, and installed in the storage unit 108. In addition, the program can be preinstalled in the ROM 102 and the storage unit 108.

In addition, in this description, the steps described in the flowcharts may naturally be performed in time series in the order described herein, may not necessarily be processed in time series, and may be executed in parallel or at a necessary timing when invoking is performed.

In the above embodiment, for thresholds for determining various conditions, adequate values can adequately be set.

It should be noted that embodiments of the present technique are not limited to the above described embodiments, and various modifications may be made to them without departing from the scope of the present technique.

In addition, the present technique can also employ the following configuration.

(1)

An information processing device has: a position sensor unit which acquires an immediate movement history which includes time series position data;

a past history DB which stores search data;

a similarity search unit which searches for a past route similar to the immediate movement history from the search data;

a fitness determination unit which determines whether or not goodness of fit of the past route searched by the similarity search unit and the immediate movement history is a predetermined threshold or more; and a sensor control unit which controls an acquisition interval of the position data of the position sensor unit according to a determination result of the fitness determination unit.

(2)

In the information processing device described in (1), when the goodness of fit is the predetermined threshold or more, the sensor control unit performs control such that the acquisition interval of the position data becomes longer than when the goodness of fit is less than the predetermined threshold.

(3)

The information processing device described in (1) or (2), further has a departure time prediction unit which predicts a departure time which is a time to depart from a current place, and when the goodness of fit is the predetermined threshold or more and a predicted departure time predicted by the departure time prediction unit comes after a predetermined time, the sensor control unit performs control such that the acquisition interval of the position data becomes longer than when the goodness of fit is less than the predetermined threshold.

(4) In the information processing device described in (3), the departure time prediction unit predicts the departure time as one of an absolute time and a relative time.

(5) In the information processing device described in any one of (1) to (4), the past history DB stores a past movement history as the search data; and the similarity search unit searches for a history similar to the immediate movement history using a distance between the past movement history and the immediate movement history as the goodness of fit.

(6) In the information processing device described in any one of (1) to (5), the past history DB stores as the search data a parameter obtained when a past movement history is learned according to a stochastic transition model, and the similarity search unit searches for a history similar to the immediate movement history using a likelihood of the stochastic transition model calculated for the immediate movement history as the goodness of fit.

(7) An information processing method includes the steps of, at an information processing device which has a past history DB which stores search data:

acquiring an immediate movement history which includes time series position data;

searching for a past route similar to the immediate movement history from the search data;

determining whether or not goodness of fit of the searched past route and the immediate movement history is a predetermined threshold or more; and controlling an acquisition interval of the position data of the position sensor unit according to a determination result.

(8) A program causing a computer to function as:

a similarity search unit which searches for a past route similar to the immediate movement history which is acquired by a position sensor unit and which includes time series position data, from the search data stored in a past history DB;

a fitness determination unit which determines whether or not goodness of fit of the past route searched by the similarity search unit and the immediate movement history is a predetermined threshold or more; and a sensor control unit which controls an acquisition interval of the position data of the position sensor unit according to a determination result of the fitness determination unit.

REFERENCE SIGNS LIST

1 Prediction device, 11 Position sensor unit, 13 Past history DB, 14 Similarity search unit, 15 Fitness determination unit, 16 Predicted route extraction unit, 17 Departure time prediction unit, 18 Prediction value calculation unit, 19 Sensor control unit, 20 DB correction unit.

The invention claimed is:

1. An information processing device comprising:
one or more processors configured to:
acquire, from a position sensor, an immediate movement history which comprises time series position data;
receive, from a memory, search data which comprises past time series position data;
calculate a similarity, as a goodness of fit, between the immediate movement history and the past time series position data,
wherein the goodness of fit is calculated based on distances between a first plurality of positions including a current position and at least one position preceding the current position in the immediate movement history and a second plurality of positions corresponding to the first plurality of positions, in the past time series position data and
wherein the second plurality of positions are obtained by tracking back a number of positions from a predetermined position in the past time series position data;
determine whether or not the goodness of fit calculated for the past time series position data and the immediate movement history is a predetermined threshold or more; and
control an acquisition interval of the position sensor to acquire the time series position data according to the determination of the goodness of fit.

2. The information processing device according to claim 1, wherein, when the goodness of fit is the predetermined threshold or more, the acquisition interval of the time series position data becomes longer than when the goodness of fit is less than the predetermined threshold.

3. The information processing device according to claim 1, wherein the one or more processors are further configured to:
predict a departure time which is a time to depart from a current position,
wherein, when the goodness of fit is the predetermined threshold or more and the predicted departure time comes after a predetermined time, the acquisition interval of the time series position data becomes longer than when the goodness of fit is less than the predetermined threshold.

4. The information processing device according to claim 3, wherein the one or more processors are configured to predict the departure time as one of an absolute time and a relative time.

5. The information processing device according to claim 1, wherein
the search data is stored as a past movement history in the memory, and
the similarity is calculated using a distance between the past movement history and the immediate movement history as the goodness of fit.

6. The information processing device according to claim 1, wherein
the search data is stored in the memory, as a parameter obtained when a past movement history, which is the past time series position data, is learned according to a stochastic transition model, and
the similarity is calculated between the past movement history and the immediate movement history using a likelihood of the stochastic transition model calculated for the immediate movement history as the goodness of fit.

7. The information processing device according to claim 1, wherein the one or more processors are configured to calculate the similarity by searching for a status node of a stochastic transition model corresponding to the immediate movement history.

8. The information processing device according to claim 7, wherein the one or more processors are configured to calculate the similarity by searching for the status node with a maximum status probability corresponding to a current position in the immediate movement history.

9. The information processing device according to claim 1, wherein the one or more processors are further configured to:

generate a sequence using a part of the past time series position data, wherein the goodness of fit of each of the positions in the part of the past time series position data is the predetermined threshold or more; and calculate an average of the generated sequence and the immediate movement history.

10. The information processing device according to claim 9, wherein the goodness of fit of each of the positions in the part of the past time series position data is the predetermined threshold or more and a number of positions in the part of the past time series position data is same as a number of positions in the immediate movement history.

11. The information processing device according to claim 9, wherein the goodness of fit of each of the positions in the part of the past time series position data is the predetermined threshold or more and a number of positions in the part of the past time series position data is different from a number of positions in the immediate movement history.

12. The information processing device according to claim 9, wherein the calculated average is a weighted average.

13. The information processing device according to claim 9, wherein the one or more processors are further configured to set first weight for the generated sequence and second weight for the immediate movement history, wherein the first weight is higher than the second weight.

14. The information processing device according to claim 1, wherein the one or more processors are configured to correct the immediate movement history based on the immediate movement history and the past time series position data when the goodness of fit is the predetermined threshold or more.

15. The information processing device according to claim 1, wherein the goodness of fit is calculated as a total sum of the distances between the first plurality of positions and the corresponding second plurality of positions.

16. An information processing method comprising:

in one or more processors:

acquiring, from a position sensor, an immediate movement history which comprises time series position data;

receiving, from a memory, search data which comprises past time series position data;

calculating a similarity, as a goodness of fit, between the immediate movement history and the past time series position data, wherein the goodness of fit is calculated based on distances between a first plurality of positions including a current position and at least one position preceding the current position in the immediate movement history and a second plurality of positions corresponding to the first plurality of positions in the past time series position data, and wherein the second plurality of positions are obtained by tracking back a number of positions from a predetermined position in the past time series position data;

determining whether or not the goodness of fit calculated for the past time series position data and the immediate movement history is a predetermined threshold or more; and controlling an acquisition interval of the position sensor to acquire the time series position data according to the determination of the goodness of fit.

17. A non-transitory computer readable medium having stored thereon, a set of computer-executable instructions, for causing a computer to perform steps comprising:

acquiring, from a position sensor, an immediate movement history which comprises time series position data;

receiving, from a memory, search data which comprises past time series position data;

calculating a similarity, as a goodness of fit, between the immediate movement history and the past time series position data, wherein the goodness of fit is calculated based on distances between a first plurality of positions including a current position and at least a position preceding the current position in the immediate movement history and a second plurality of positions corresponding to the first plurality of positions in the past time series position data, and wherein the second plurality of positions are obtained by tracking back a number of positions from a predetermined position in the past time series position data;

determining whether or not the goodness of fit calculated for the past time series position data and the immediate movement history is a predetermined threshold or more; and controlling an acquisition interval of the position sensor to acquire the time series position data according to the determination result of the goodness of fit.

* * * * *